United States Patent [19]
Taylor et al.

[11] Patent Number: 5,534,612
[45] Date of Patent: Jul. 9, 1996

[54] GLASS FIBER BINDING COMPOSITIONS, PROCESS OF MAKING GLASS FIBER BINDING COMPOSITIONS, PROCESS OF BINDING GLASS FIBERS, AND GLASS FIBER COMPOSITIONS

[75] Inventors: Thomas J. Taylor; William H. Kielmeyer, both of Englewood, Colo.

[73] Assignee: Schuller International, Inc., Denver, Colo.

[21] Appl. No.: 64,759

[22] Filed: May 19, 1993

Related U.S. Application Data

[63] Continuation-in-part of Ser. No. 886,668, May 19, 1992.
[51] Int. Cl.$^6$ .................................................. C08G 8/04
[52] U.S. Cl. .................... 528/129; 528/144; 528/145; 528/156; 528/157; 528/158; 528/161; 524/593; 524/594; 524/596
[58] Field of Search ................................ 524/593, 594, 524/596; 528/129, 144, 145, 156, 157, 158, 161

[56] References Cited

U.S. PATENT DOCUMENTS

| | | | |
|---|---|---|---|
| 2,343,972 | 3/1944 | Harvey | 260/67 |
| 2,397,453 | 3/1946 | White et al. | 260/8 |
| 2,487,394 | 11/1949 | Stierli | 260/45.2 |
| 2,510,496 | 6/1950 | Carlin | 260/70 |
| 2,521,532 | 9/1950 | Mitman et al. | 260/17.4 |
| 2,723,209 | 11/1955 | Philipps | 117/126 |
| 2,830,971 | 4/1958 | Brown et al. | 260/67 |
| 2,861,980 | 11/1958 | Fischer | 260/71 |
| 3,145,438 | 8/1964 | Kottke et al. | 22/193 |
| 3,222,315 | 12/1965 | Singer | 260/39 |
| 3,491,041 | 1/1970 | Dornte | 260/18 |
| 3,594,345 | 7/1971 | Brown et al. | 260/37 |
| 3,681,286 | 8/1972 | Brown et al. | 260/67 |
| 3,793,286 | 2/1974 | Peterson et al. | 260/38 |
| 3,813,371 | 5/1974 | Bozer et al. | 260/88.5 |
| 3,816,375 | 6/1974 | Bozer et al. | 260/67 |
| 3,850,727 | 11/1974 | Bozer et al. | 156/335 |
| 3,888,816 | 6/1975 | Brown et al. | 260/39 |
| 3,893,964 | 7/1975 | Kawai et al. | 260/29.4 |
| 3,914,192 | 10/1975 | Flautt et al. | 260/4 R |
| 3,925,286 | 12/1975 | Fahey | 260/29.3 |
| 3,927,139 | 12/1975 | Bozer et al. | 260/37 |
| 4,017,461 | 4/1977 | Dunlop et al. | 260/67 R |
| 4,021,401 | 5/1977 | Jeppsen | 260/37 |
| 4,053,447 | 10/1977 | Shea | 260/38 |
| 4,076,873 | 2/1978 | Shea | 428/35 |
| 4,134,442 | 1/1979 | Laitar | 164/43 |
| 4,137,387 | 1/1979 | Misertis et al. | 526/62 |

(List continued on next page.)

FOREIGN PATENT DOCUMENTS

| | | | |
|---|---|---|---|
| 1200336 | 2/1986 | Canada | C08L 59/00 |
| 2010532 | 3/1975 | Germany . | |
| 565340 | 10/1944 | United Kingdom . | |
| 626645 | 7/1949 | United Kingdom . | |
| 954084 | 4/1964 | United Kingdom . | |
| 1457216 | 12/1976 | United Kingdom | C08K 5/54 |

OTHER PUBLICATIONS

Furan Polymers, Reprint from Encyclopedia of Polymer Science and Technology, vol. 7, 1967, pp. 432–445.
F. H. Newth et al., 2,5–Bishydroxymethylfuran, Research Supplement 3–I, Research Correspondence, 1950, pp. 50–51.
R. T. Conley et al., An Investigation of the Structure of Furfuryl Alcohol . . . Spectroscopy, J. of Applied Polymer Science, vol. 7, 1963, pp. 37–52.
E. M. Wewerka et al., A Study of the Low Molecular Weight Components of Furfuryl Alcohol Polymers, J. of Applied Polymer Science, vol. 13, 1971, pp. 1437–1451.
C. R. Schmitt, Polyfurfuryl Alcohol Resins, Polymer–Plast. Technol. Eng., 3(2), 1974, pp. 121–158.
R. H. Leitheiser et al., Water Dilutable Resin Binder For Particleboard, presented at "Wood Adhesives . . . Needs", Symposium, Madison, Wis., Sep. 23–25, 1980, pp. 59–64. Furan Derivates, vol. 11, 1980, pp. 499–527.
Z. Laszlo–Hevdig et al., Some Kinetic Features of the Initial Stage of the Acid—Catalyzed . . . 1, Die Angewandte Makromolekulare Chemie, 107, 1982, pp. 61–73.
J. P. Pfau et al., Heat–Initiated Furan Resin For Rapid Runway Repair, ESL–TR–82–37, AFESC, Tyndall Air Force Base, FL, Aug. 1983, pp. 1–24.
Z. Laszlo–Hedvig et al., Some Kinetic Features of the Initial Stage of Acid—Catalyzed . . . II*, Die Angewandte Makromolekulare Chemie, 122, 1984, pp. 51–59.
QO Chemicals, Inc., Material Safety Data Sheet, for QUA-CORR™ 1300 Resins, Apr. 12, 1989, one page.
QO Chemicals, Inc., Material Safety Data Sheet for Furfuryl Alcohol, Jun. 23, 1989, two pages.
A. Gandini, Polymers and Oligomers Containing Furan Rings, Agricultural and Synthetic Polymers, 1990, pp. 195–208. Developed from TX Symposium Apr. 9–14 1989.
QO Chemicals, Inc., Versatile Chemicals from Nature brochure, 1990, six pages.
The Quaker Oats Company – Chemicals Division, Material Safety Data Sheets, for Fa–RezB–260, two pages.

*Primary Examiner*—Edward Cain
*Attorney, Agent, or Firm*—Cornelius P. Quinn

[57] ABSTRACT

The present invention relates to a glass fiber binding composition having an effective binding amount of an aqueous compatible furan resin mixed with sufficient water to result in a binding composition having from 0.5 to 80% nonvolatile. The aqueous compatible furan resin is the reaction product of a source of ammonia and a first reaction product, the first reaction product being derived from the reaction of an acidic furan resin, a source of reactable formaldehyde, and a formaldehyde scavenger. The invention further pertains to a process of binding glass fibers at junctions of the fibers comprising the steps of providing glass fibers, applying an effect binding amount of the binding composition of the invention to the glass fibers such that the binder is present at a portion of the junctions, and curing the resin at the junctions of the glass fibers. Finally, the invention also discloses glass fiber compositions comprising a plurality of glass fibers having a plurality of junctions where two or more fibers meet, and an effective binding amount of the binding composition of the invention.

14 Claims, 1 Drawing Sheet

U.S. PATENT DOCUMENTS

| | | | |
|---|---|---|---|
| 4,154,797 | 5/1979 | Misertis et al. | 422/131 |
| 4,178,273 | 12/1979 | Brown | 260/29.4 |
| 4,212,909 | 7/1980 | Brown | 427/393.5 |
| 4,243,780 | 1/1981 | Kruglikov et al. | 260/829 |
| 4,283,462 | 8/1981 | Meyer et al. | 428/506 |
| 4,291,088 | 9/1981 | Wolff | 428/313 |
| 4,309,512 | 1/1982 | Mikogami et al. | 525/58 |
| 4,361,613 | 11/1982 | Bogner et al. | 428/119 |
| 4,426,460 | 8/1982 | Pentz | 321/115 |
| 4,430,459 | 2/1983 | Akerberg et al. | 523/144 |
| 4,439,348 | 3/1984 | Akerberg | 252/426 |
| 4,463,043 | 7/1984 | Reeves et al. | 428/68 |
| 4,548,752 | 10/1985 | Pentz | 260/330.9 |
| 4,640,934 | 2/1987 | Michel | 521/103 |
| 4,735,974 | 4/1988 | Mandorf | 523/141 |
| 4,761,441 | 8/1988 | Woodson | 523/439 |
| 4,832,723 | 5/1989 | Shisler et al. | 65/14 |

GLASS FIBER BINDING COMPOSITIONS, PROCESS OF MAKING GLASS FIBER BINDING COMPOSITIONS, PROCESS OF BINDING GLASS FIBERS, AND GLASS FIBER COMPOSITIONS

CROSS-REFERENCE TO RELATED APPLICATION

This application is a continuation-in-part of U.S. Ser. No. 886,668, filed May 19, 1992, pending and entitled "Glass Fiber Binding Compositions, Process Of Binding Glass Fibers, And Glass Fiber Compositions".

FIELD OF THE INVENTION

This application relates to aqueous compatible furan binder compositions for glass fibers, a process of making a glass fiber binding composition utilizing an aqueous compatible furan resin, a process for binding glass fibers, and also to glass fiber compositions utilizing the binders.

BACKGROUND OF THE INVENTION

Fiber glass comes in many shapes and sizes and can be used for a variety of applications. A general discussion of fiber glass technology is provided in "Fiber Glass" by J. Gilbert Mohr and William P. Rowe, Van Nostran Reinhold Co., New York 1978 which is herein incorporated by reference.

As discussed in "Fiber Glass", glass fibers are generally mass produced in two types: bulk or blown fiber for insulation and allied applications, and continuous-filament, or reinforcing fibers. In either form raw fiber glass is abrasive and easily fragmentized. Damage to the individual glass fibers can occur as a result of the self-abrasive motion of one fiber passing over or interacting with another fiber. The resulting surface defects cause reductions in overall mechanical strength.

Consequently, binders have been developed to prevent these problems. A typical binder may prevent the destructive effects of self-abrasion without inhibiting the overall flexibility of the finished glass fiber product. Extremely good resistance and resilience to conditions of elevated humidity and heat are beneficial in view of the wide variety of end use applications for glass fiber/binder compositions.

One of the most important performance properties is a consequence of the practical realities of the glass fiber manufacturing business. Cured glass fiber/binder compositions are normally very bulky and voluminous. Batts and rolls used as insulation in buildings have densities ranging from 0.5 to 1.0 pound per cubic foot (pcf) and generally require binder contents of 3 to 7% by weight. Since it is prohibitively expensive to ship such materials in an uncompressed state, the batts and rolls are bundled and compressed in packages to 8 to 25% of their manufactured thickness. During the shipping process these packages are normally subjected to conditions of elevated temperature and humidity. Once the compressed batt or roll reaches the consumer and is removed from its packaging, it should recover between 40% to 100% of its original volume. Insulation materials not achieving such recovery values normally have difficulty meeting advertised thermal resistivity (R) values. In general, the better the recovery value of the glass fiber/ binder composition, the better insulating properties the composition will possess.

Fiber glass products denser than 0.7 pcf generally have load bearing requirements, either in the form of compressive or flexural strength, as well as thermal and sound attenuation restrictions.

The amount of binder present in a fiber glass product is dependent on several factors including the product shape, the type of service required, compressive strength requirements and anticipated environmental variables such as temperature. Binder content is determined by the loss on ignition test, described below, and is given as % L.O.I. In general, binder contents may range from 1 to 25% L.O.I., depending on the specific end use application. Applications include sound control batts with low binder content; industrial-grade thermal insulation for driers, ovens, boilers, furnaces, and other heat generators; low-to-intermediate L.O.I. duct liners and fiber glass flexible ducts and high-L.O.I. rigid ducts; and pipe insulation with intermediate to high binder levels. Molded fiber glass parts (e.g., automotive topliners) are generally thin pieces of high density (15–22 pounds per cubic foot at ⅛ to ⅜ inches thick, for example) and require binders to provide excellent flexural strength. Fiber glass products used for filtration have wide ranges of fiber diameter and binder levels.

Traditionally, the performance parameters of these types of insulation as well as the high compressibility ratios and recovery values desired by glass fiber products in general have been obtainable only with phenol formaldehyde resins. As a result, for many years glass fiber binders have been almost exclusively based upon phenol formaldehyde resins. These systems typically include aminoplast resins such as melamine and urea, silicone compounds, soluble or emulsified oils, wetting agents, and extenders or stabilizers.

Although widespread, the use of phenol formaldehyde resins in binders for fiber glass involves numerous problems and disadvantages.

Chief among these is compliance with ever stricter environmental regulations. Typically phenolic binders contain large amounts of low molecular weight species including phenol, formaldehyde and volatile 1:1 and 1:2 phenol formaldehyde adducts such as 2-methylolphenol and 4-methylolphenol. During the curing process, these volatile low molecular weight components are released into the atmosphere in substantial volumes as volatile organic compounds (VOC). Since the process of manufacturing fiber glass typically involves spraying large volumes of phenol formaldehyde binders into high volume air streams, and then curing the product in convection ovens that involve high volumes of air, fiber glass manufacturers have an urgent need to reduce their VOC emissions, particularly with regard to formaldehyde. Such reduction must occur without an increase in the emissions of compounds such as furfuryl alcohol, bis-hydroxymethyl furan, and the like.

Attempts at reducing the free formaldehyde content of typical phenol formaldehyde binders have been unsuccessful because excess formaldehyde is essential to curing and bonding in such systems. Techniques such as scrubbing and incineration would require substantial financial expenditures with the potential for uncertain results.

Attempts to convert free formaldehyde into less obnoxious and dangerous chemicals have involved the addition of ammonia or urea. Such additions were intended to convert free formaldehyde into hexamethylenetetramine or a mixture of mono and dimethylol ureas. Unfortunately however, urea, hexamethylenetetramine, and mono and dimethylol ureas can all contribute to the production of trimethylamine, which gives the cured phenolic binder and finished product an undesirable "fishy" odor. In addition, nitrogen containing compounds can decompose to yield ammonia and other potentially harmful volatile compounds.

Phenol formaldehyde resins also require careful handling procedures. Since the cooked resin must be refrigerated until use, refrigerated trucks and holding tanks are required. Even with refrigeration, the storage life of a phenolic resin is typically 15 days.

Adding to these problems is the fact that phenol formaldehyde resins have a short life span. Finished binders based on such resins must be used within 2 to 12 hours of their initial formulation.

Finally, because phenol formaldehyde resins are petroleum based, they are particularly vulnerable to fluctuations in price and availability.

As a result, an alternative to phenol formaldehyde based fiber glass binders has long been sought.

The present invention solves the problems caused by the use of phenol formaldehyde resins in binders for fiber glass by providing binders based on aqueous compatible furan resins. The furan binders of the instant invention provide many of the advantages of phenolic binders while resulting in substantially reduced VOC emissions. What is particularly desirable about the furan binders disclosed herein is the use of water as a significant component.

The furan binders of the present invention have several advantages. Formaldehyde is not a significant curing or decomposition product and the furan resins form very rigid thermosets. Since furan resins are derived from vegetable cellulose, a renewable resource, they are relatively inexpensive and readily available.

It is, therefore, an object of the present invention to provide a binder for fiber glass which will provide substantially all of the advantages of phenol formaldehyde binders while simultaneously resulting in significantly reduced emissions of volatile organic compounds, particularly formaldehyde. It is a further object to accomplish such VOC reductions while not producing an increase in the emissions of materials such as furfuryl alcohol, bis-hydroxymethylfuran and 5-methylfurfural.

It is also an object of the present invention to provide a binder for glass fibers which is particularly low in free furfuryl alcohol such that application of the binder to glass fibers result in low levels of furfuryl alcohol and formaldehyde emissions.

It is a further object of the present invention to provide a method of making glass fiber binding compositions utilizing aqueous compatible furan resins.

Another object of the present invention is to provide methods of applying the novel furan binder to raw or bare glass fibers so as to provide the required performance characteristics.

An additional object of the invention is to provide glass fiber compositions employing the novel binders which are suitable for incorporation into a variety of end use applications.

SUMMARY OF THE INVENTION

The present invention particularly relates to glass fiber binding compositions utilizing aqueous compatible furan resins which upon application to glass fibers produce low levels of formaldehyde and other undesirable volatile organic compounds (VOCs). The glass fiber binding compositions disclosed herein have an effective binding amount of an aqueous compatible furan resin which is the reaction product of a source of ammonia and a first reaction product, the first reaction product being the reaction product of an acidic furan resin, a source of reactable formaldehye and a formaldehyde scavenger. The effective binding amount of the aqueous compatible furan resin is mixed with a sufficient amount of water to result in a binding composition having from 0.5 to 80% non-volatile.

The invention also pertains to a method of making the claimed binding compositions, consisting of the steps of providing an effective binding amount of an acidic aqueous compatible furan resin; providing a source of reactable formaldehyde; mixing a formaldehyde scavenger with the furan resin in the presence of the source of reactable formaldehyde to form a first mixture; heating the first mixture to a temperature of less than 100° C. for period of from 1 to 10 hours; adding a source of ammonia to the first mixture to form a second mixture; heating the second mixture to a temperature of less than 100° C. for a period of from 1 to 10 hours; and adding sufficient water to the heated second mixture to form a binding composition having from 0.5 to 80% nonvolatile.

The invention also provides a method of binding glass fibers utilizing the disclosed glass fiber binding compositions, the disclosed process of binding glass fibers producing particularly low levels of undesirable volatile organic compounds.

Finally, the invention also discloses glass fiber compositions utilizing the disclosed glass fiber binding compositions. The glass fiber compositions of the invention have a plurality of glass fibers having a plurality of junctions where two or more fibers meet and an effective binding amount of a glass fiber binding composition which is made of an effective binding amount of an aqueous compatible furan resin which is the reaction product of a source of ammonia and a first reaction product, said first reaction product comprising the reaction product of an acidic aqueous compatible furan resin, a source of reactable formaldehyde and a formaldehyde scavenger, where the effective amount of the aqueous compatible furan resin is mixed with a sufficient amount of water to result in a binding composition having from 0.5 to 80% nonvolatile.

DETAILED DESCRIPTION OF THE PREFERRED EMBODIMENT

Figure 1:
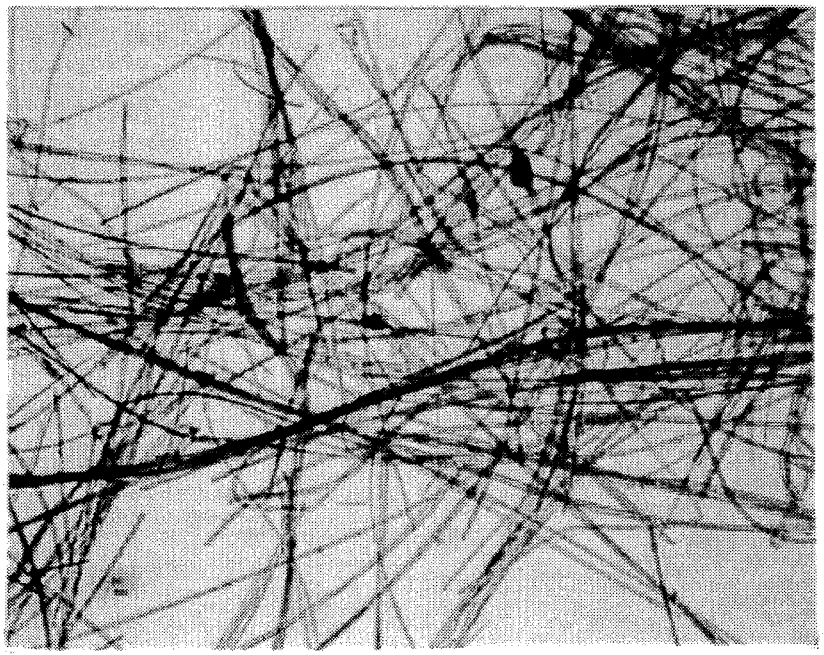
FIG. 1 illustrates a desired distribution of a 66% N.V. bis(hydroxmethyl)furan resin based binder applied to glass fibers.

The present invention broadly provides glass fiber binding compositions comprised of aqueous compatible furan resins which provide finished products with properties similar to that achieved with traditional phenol formaldehyde binders. Compatible as used herein is defined as an aqueous mixture comprised of water and a resinous or polymeric component forming either a solution, an emulsion, or a sol. Those skilled in the art will appreciate that a furan resin will be deemed aqueous compatible if, at some ratio of resin to water, a mixture will form which is either a solution, an emulsion or a sol. The use of furan resins greatly reduces the emissions of particular VOC's such as formaldehyde and furfuryl alcohol during the curing cycle. The emissions of other VOC's such as bis hydroxymethyl furan (BHMF), and 5-methylfurfural (5 mF) are also decreased with the use of the furan resin based binders disclosed herein. The present invention also provides a process of making the claimed glass fiber binding compositions, a process of binding glass fibers and further provides for glass fiber compositions having applicability for use in a wide variety of end products.

Furan is traditionally defined as a heterocyclic ring compound with two carbon-carbon double bonds linking an oxygen atom on one side with a single carbon-carbon bond on the other. As used herein, furan resin is defined to include resinous products which are comprised of polymer molecules which contain the traditional furan ring structure as described above as well as the saturated analogs thereof. Such analogs will consist of five membered rings having four carbons and one oxygen and 0 to 1 carbon-carbon double bonds. The structures encompassed by this definition are illustrated below:

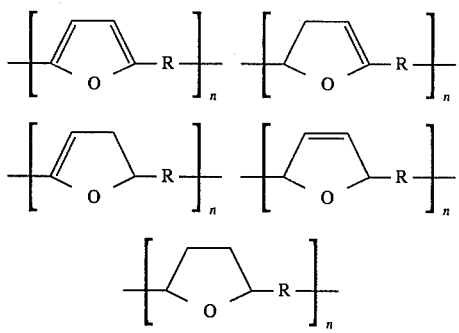

wherein R may be methylene; methylidyne; methylcarbonyl; methylester; methylene ether; methylene dioxy; ethylene; heterocyclic; polymeric methylene ether wherein R is ($-CH_2-(OCH_2)_n-$) and n may be from 1 to 10; ethylene methyl carbonyl; ethylene methyl ester; methylene oxy; ethyl oxy; and hydroxy methyl. Of these, it is most preferred that R be methylene, methylene ether, or polymeric methylene ether wherein n is 1 to 5.

R may also be characterized as the residue resulting from the polymerization of at least one reactant selected from the group consisting of:
furan, furfural, furfuryl alcohol,
5-hydroxymethyl-2-furancarboxyaldehyde,
5-methyl-2-furancarboxyaldehyde; 2-vinyl furoate,
5-methyl-2-furancarboxyaldehyde; 2-vinyl furoate,
5-methyl-2-vinylfuroate, 5-tertbutyl-2-vinyl furoate,
2-furfurylmethacrylate, 2-furfuryl methylmethacrylate,
2-vinyl furan, 5-methyl-2-vinyl furan,
2-(2-propylene)furan (or 2-methyl vinylidene furan),
5-methyl-2-methyl vinylidenefuran,
furfurylidene acetone, 5-methyl-2-furfurylidene acetone,
2-vinyl tetrahydrofuran, 2-furyl oxirane,
5-methyl-2-furyloxirane, furfuryl vinyl ether,
5-methyl-furfuryl vinyl ether,
vinyl 2-furyl ketone,
bis-2,5-carboxyaldehyde furan,
bis-2,5-hydroxymethyl furan,
5-hydroxymethyl-2-ethyl furanacrylate,
2,5-furandicarboxylic acid,
5-hydroxymethyl-2-furan carboxylic acid,
2,5-furan diacid dichloride,
2,5-furan dicarboxylic acid dimethyl ester,
2,5-furan methylamine,
5-carboxy-2-furan amine,
5-methylester-2-furan amine,
bis-(2,5-methylene isocyanate)furan,
bis(2,5-isocyante)furan,
2-isocyanatefuryl, and
2-methylene isocyanate furyl.

It will be appreciated that the composition of R will vary greatly as it is dependent upon the identity of the starting reactants and the mechanism of polymerization; "n" may be any value greater than 1 but will most preferably be no greater than 25.

One of the chief advantages in using furan-based binders stems from the fact that they are derived from vegetable cellulose. Suitable sources of vegetable cellulose are corn cobs, sugar cane bagasse, oat hulls, paper mill byproducts, biomass refinery eluents, cotton seed hulls, rice hulls, and food stuffs such as saccharides and starch. These materials undergo acid digestion to produce furfural. Furfural is the chief reagent used to produce materials such as furfuryl alcohol, 5-hydroxymethyl-2-furancarboxyaldehyde (HMF), 2,5-dicarboxyaldehyde-furan, and bis(hydroxymethyl)furan (BHMF). These furan containing monomers in turn can undergo reactions to produce various furan containing monomers with a wide variety of substituents at the $C_2$ and $C_5$ positions.

Although furan resins may be identified via the names of the starting reactants (i.e., furfural-phenol resin or furfuryl alcohol resin) the term furan resin as used herein is intended to describe resins derived from a variety of starting reactants. Typically at least one of these reactants will contain the basic furan ring structure or the saturated analogs thereof. Accordingly, the term furan resin is further defined as a resinous mixture comprised of either monomers, oligomers, polymers and/or mixtures thereof, resulting from the polymerization reaction wherein at least one of the reactants is selected from the group consisting of the furan containing molecule having the general formula:

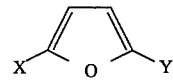

and its saturated analogs thereof having 0 to 1 carbon-carbon double bonds, wherein X and Y are independently organic substituent groups. This group is illustrated below:

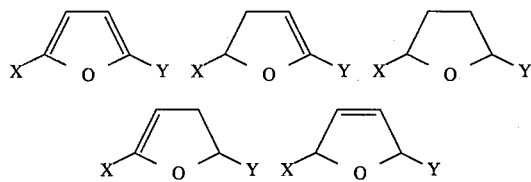

Suitable X and Y groups are those comprised of molecular species comprising one or more functional moieties selected from the group consisting of: hydrogen; $C_1$–$C_{10}$ alkyl groups; mono, di- or tri-substituted vinyl radicals; di- or tri-substituted aromatic rings; ketones; anhydrides; polysubstituted furfuryl; hydroxyls; aldehydes; carboxylic acids; esters; ethers; amines; amides; imines; imides; alkynes; alkyl halides; aromatic halides; olefinic halides; ethers; thiols; sulfides; nitriles; nitro groups; sulfones; carbofunctional siloxanes; and sulfonic acids. It will be appreciated that combinations of these various functional groups can be employed to form either X or Y.

Examples of specific compounds containing suitable X and Y groups include:

furan, furfural, furfuryl alcohol,
5-hydroxymethyl-2-furancarboxyaldehyde,
5-methyl-2-furancarboxyaldehyde, 2-vinyl furoate,
5-methyl-2-vinylfuroate; 5-tertbutyl-2-vinyl furoate,
2-furfurylmethacrylate, 2-furfuryl methylmethacrylate,
2-vinyl furan, 5-methyl-2-vinyl furan,
2-(2-propylene)furan (or 2-methyl vinylidene furan),
5-methyl-2-methyl vinylidenefuran;
furfurylidene acetone, 5-methyl-2-furfurylidene acetone,
2-vinyl tetrahydrofuran, 2-furyl oxirane,
5-methyl-2-furyloxirane, furfuryl vinyl ether,
5-methyl-furfuryl vinyl ether,
vinyl 2-furyl ketone,
bis-2,5-carboxyaldehyde furan,
bis-2,5-hydroxymethyl furan,
5-hydroxymethyl-2-ethyl furanacrylate,
2,5-furandicarboxylic acid,
2,5-furan diacid dichloride,
2,5-furan dicarboxylic acid dimethyl ester,
2,5-furan methylamine,
5-carboxy-2-furan amine,
5-methylester-2-furan amine,
bis-(2,5-methylene isocyanate)furan,
bis(2,5-isocyante)furan,
2-isocyanate furyl, and
2-methylene isocyanate furyl.

It is preferred that X and Y be comprised of molecular species containing one or more functional moieties selected from the group consisting of hydrogen; $C_1$–$C_6$ alkyl groups; mono-, di-, or tri-substituted vinyl radicals; ketones; hydroxyls; aldehydes; carboxylic acids; esters; ethers; amines; amides; imines, imide; and polysubstituted furfuryls.

It is furthermore particularly desired that at least one of X and Y be comprised of a molecular species comprising an oxygen containing functional moiety such as a ketone, hydroxyl, aldehyde, carboxylic acid, ester or ether.

It is most preferred suitable that X and Y be comprised of methylol (—$CH_2OH$) terminated groups. Accordingly, a suitable furan resin for use in the glass fiber binding compositions described herein are those resins resulting from the polymerization of 2,5-bis(hydroxymethyl)furan. Such resins may be further defined as 'BHMF' resins.

These furan containing monomers can polymerize through two well known mechanisms. The first involves chain or polyaddition polymerization which is initiated by well known free radical, cationic or anionic promoters. This method of polymerization produces macromolecules with furan rings branching from the main chain. A comprehensive discussion of such reactions is provided by *Agricultural and Synthetic Polymers, Biodegradability and Utilization;* edited by J. E. Glass and G. Swift, Symposium sponsored by Divisions of Cellulose, Paper and Textile Chemistry; and Polymeric Materials: Science and Engineering at the 197th National Meeting of the American Chemical Society, Dallas, Tex., Apr. 9–14, 1989, herein incorporated by reference.

The second method is typically known as condensation polymerization. Polymers and copolymers resulting from acid catalyzed condensation reactions result in macromolecules with furan rings in the main chain. As a general rule, the furan resins formed by polycondensation reactions have stiffer chains and higher glass transition temperatures. These reactions may involve self condensation of the furan monomers described above, as well as condensation reactions of such monomers with aminoplast resins, organic anhydrides, aldehydes such as formaldehyde, ketones, urea, phenol and other suitable reagents. Most preferably the binder compositions described herein will contain furan resins produced by acid catalyzed condensation reactions.

An example of a suitable furan resin for use herein is Farez™ M, a commercially available composition from QO™ Chemicals, a division of Great Lakes Chemical Corporation, located in West Lafayette, Ind. The material safety data sheet (MSDS) for Farez™ M indicates that it is a furfuryl alcohol-urea formaldehyde resin containing about 6% free furfuryl alcohol and 0.4 to 1.1% by weight free formaldehyde. This resin is believed to be based on the most preferred furan monomer wherein X and Y are terminal methylol groups; i.e. bis(hydroxymethyl)furan ("BHMF").

Another material supplied by QO™ Chemicals, Inc. has also been found suitable. Quacorr™ 1300 is a commercially available resin believed to result from the acid catalyzed self condensation of furfuryl alcohol. Quacorr™ 1300 is received with a viscosity of about 2000 to 17,000 cPs at 25° C. It contains between 2 to 18% free furfuryl alcohol and is believed to have a substantial fraction of higher molecular weight oligomers. It has a percent nonvolatile between 72 to 98%.

Farez™ M, as received from QO™ Chemicals, Inc., has a pH of between 4.0 to 7.0, 13 to 17% by weight water and 4–7% by weight unreacted furfuryl alcohol. Because furfuryl alcohol is relatively volatile, it is most preferred that its presence be minimized to decrease overall VOC. Farez™ M normally has a percent nonvolatile (% N.V.) of approximately 75%–90% and is received at a viscosity of between 250 cPs to 2,000 cPs at 25° C. A hydroxyl number of 17 to 21% has been measured for different batches of this material.

However, it has been found that in order to further reduce the total VOC emissions, it is necessary to utilize furan resins having low levels of monomeric or volatile species such as formaldehyde and furfuryl alcohol. Accordingly, while the above resins are suitable for use herein, the most preferred resin for use herein is Farez™ XP type 'M' as supplied by Q. O. Chemicals The MSDS sheet for this resin indicates that it is a furrural alcohol-formaldehyde resin with 9% by weight formaldehyde. This resin generally has less than 2% furfuryl alcohol.

An identifying parameter of the furan resins suitable for use herein is the cloud point. This refers to the maximum percentage of water which the resin can absorb while maintaining a single phase solution. The most preferred furan resins for use herein will have a cloud point above 60.

The hydroxyl number or percent hydroxyl was determined using the following testing procedure. Approximately 1.2 grams of binder was dissolved in 25 milliliters of pyridine in a volumetric flask. Sufficient 3A molecular sieve was added to cover the bottom of the flask. The flask was shaken and left to stand overnight in order to remove any water present in the binder sample. Residual water was determined by the presence of a shoulder at 3560 $cm^{-1}$ and corrected by the addition of more 3A molecular sieve. A Perkin-Elmer 621 Grating Spectrophotometer, equipped with an infrared absorbance mode, was used to determine the hydroxyl number. The sample and reference cell were a pair of matching NaCl liquid cells with 0.05 to 0.10 mm path lengths and were scanned from 4000 $cm^{-1}$ to 3200 $cm^{-1}$. Absorbance was read at a peak maximum of 3240 $cm^{-1}$. Standard curves for each sample cell were generated by analyzing solutions containing 1.25, 0.625, 0.313, and 0.156 grams of furfuryl alcohol or bis(hydroxymethyl)furan per 25 ml dry pyridine. Solutions were scanned in NaCl liquid cells of path lengths 0.075 mm. A standard curve absorbance versus concentration was plotted and the percent hydroxyl calculated by extrapolating grams of hydroxyl per 25 ml sample and then dividing this value by the sample weight in grams and multiplying by 100.

Additional water is added to the material as received from QO™ Chemicals, Inc to make the glass fiber binders of the invention. Addition of water between 10% to 70% by weight produces acceptable viscosities of between 1.1 cPs to 600 cPs. Generally, between 15 to 99% water by weight of the binder composition may be added to obtain binding compositions with a % nonvolatile (% N.V.) from 0.5 to 80%. However, it has been found that adding more than 15 to 17% by weight water to some furan resins may produce nonhomogeneous mixtures. Although two-phase binders can provide desired properties, one phase systems are most preferred. Thus in the absence of the co-solvents discussed below, it is preferable that 13 to 17% by weight of water be added to the furan resins such as Farez M and QuaCorr™ 1300. Such an addition results in approximately 30% total water by weight.

Preferably, sufficient water will be added to the most preferred furan resin so as to achieve a binder having between 0.5 to 80% N.V. Most preferably, these furan resins, ie Farez XP "M" will initially be combined with sufficient water so as to achieve binder compositions having from 40–60% N.V. It will be appreciated by those skilled in the art that subsequent dilutions with water may occur in response to processing considerations. As indicated above, these dilutions may result in solutions having a % N.V. as low as 0.5%. Those skilled in the art will appreciate that % N.V. as used herein refers to the theoretical amount of non-volatile materials in the binder. Generally, this will consist of the resin solids (also known as active binder solids) and the solid or nonvolatile portions of any catalysts, additives, fillers etc. used in the binder. Active binder solids may be defined to include all materials which are believed to participate in the binder forming reaction. Those skilled in the art will appreciate that this will include the nonvolatile portions of materials such as the furan resin, urea, and melamine.

Lower viscosities from 2 to 400 cPs are normally preferred and viscosities in the range of 2 to 200 cPs at 25° C. are most preferred.

In some cases, it will be necessary to incorporate a co-solvent to achieve these viscosities. These lower viscosities may be achieved by the addition of organic mono-, di-, and polyacids as co-solvents. Co-solvent is defined herein as any material which upon addition to the composition allows for the addition of greater amounts of water. These co-solvents are generally added in an amount equal to 2 to 10% by weight. Examples of suitable organic mono-, di-, and polyacids are methacrylic acid, propionic acid, levulinic acid, maleic acid, citric acid and succinic acid. Of these maleic acid is most preferred in an amount from 1 to 8% by weight and most preferred in an amount from 2 to 6%.

In addition to water and a co-solvent where necessary, an effective amount of one or more materials traditionally known as acid catalysts may be added to the furan resin as received from QO™ Chemicals. Acid catalysts for curing furan resins are well known in the art. Selection of a particular catalyst ultimately depends upon the desired rate of cure and desired end properties. A feature of the present invention is the choice of particular combinations of catalysts to minimize the release of VOC's originating from different resin components. For the purposes of the present invention, this element of the preferred binder compositions will be defined as a catalyst system. The term catalyst system is intended to encompass combinations of catalysts as well as the use of single catalysts.

Materials known to be suitable for curing furan resins include inorganic and organic acids. Suitable organic acids which may be defined as active catalysts include aliphatic saturated monocarboxylic acids, aliphatic unsaturated monocarboxylic acids, saturated and unsaturated dicarboxcylic acids, hydroxy acids, aromatic acids and diacids, and alicyclic acids. Examples of suitable organic and inorganic acids include hydrochloric acid, sulfuric acid, nitric acid, phosphoric acid, benzene sulfonic acid, toluene sulfonic acid, xylene sulfonic acid, napthalene sulfonic acid, oleic acid, benzoic acid, salicylic acid, acetic acid, propionic acid, maleic acid, fumaric acid, oxalic acid, malonic acid, phthalic acid, lactic acid, succinic acid, glutaric acid, adipic acid, citric acid, tartaric acid and levulinic acid. Of these tartaric acid and maleic acid are preferred and maleic acid most preferred.

Friedel-Crafts type catalysts such as aluminum chloride, zinc chloride, aluminum bromide, and boron fluoride are also suitable.

Salts of both inorganic and organic acids may also be used. Examples of suitable inorganic acid salts are ammonium chloride, ammonium sulfate, ammonium hydrogen sulfate, ammonium nitrate, aluminum chloride, aluminum nitrate, aluminum sulfate, copper chloride, copper nitrate, copper sulfate. Of these, ammonium sulfate is most preferred. Ammonium sulfate in particular may be defined as a latent catalyst which may become active at approximately 110°–150° Celsius. Suitable organic salts are the urea salt of toluene sulfonic acid, the polyammonium salts of polycarboxylic acids such as the diammonium salts of citric acid and the ammonium salts of maleic acid.

Acid anhydrides are also suitable for use as catalysts in the present invention. In particular, cyclic anhydrides resulting from the dehydration of dicarboxylic acids are suitable for use in the present invention. Suitable acid anhydrides include acetic anhydride, maleic anhydride, succinic anhydride and phthalic anhydride. Of these maleic anhydride is most preferred. Although not wishing to be bound to any particular theory, it is believed that in addition to functioning as a catalyst, polyether co-polymers are formed between the anhydride and the free hydroxylated species present in the resin.

Although not wishing to be bound to any particular theory, it is believed that maleic acid, in addition to functioning as a co-solvent where necessary, also promotes the polymerization reaction. Furthermore, it is believed that maleic acid may preferentially reduce the emission of BHMF monomer during the curing process. Since it is desirable to maximize the reduction of VOC's, the most preferred catalyst system will be comprised of maleic acid and ammonium sulfate.

In addition to functioning as a true active catalyst and as a co-solvent where necessary, it is further believed that maleic acid may modify the molecular structure of the most desirable BHMF resin via the following reaction:

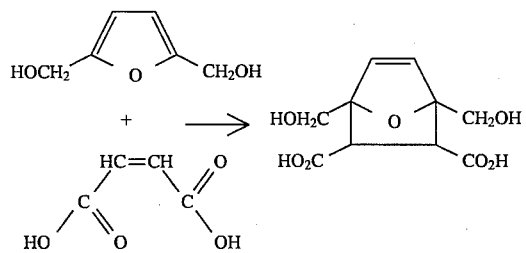

X may be either (—CH$_2$OH) or a polymer chain. The remaining free acid groups may act to 'catalyze' the reaction at conditions of elevated temperatures. Although a catalyst has been traditionally defined as a substance whose presence changes the rate of a chemical reaction without undergoing permanent change in its composition, catalyst as used herein is further defined to include materials such as maleic acid and maleic anhydride whose molecular structure may be altered via reaction with the macromolecules of the furan resin.

Of course, it will be appreciated by those skilled in the art that this is an expected mechanism only.

It has been found that the catalyst system should be generally present in an amount equal to 1–20% by weight of resin solids or active binder solids. Preferably, the catalyst should be present in an amount from 5–12% and most preferably, 6–10% by weight of active binder solids. If using the most preferred catalyst of maleic acid and ammonium sulfate, the ratio of maleic acid to ammonium sulfate will preferably be from 10:1 to 10:1. Most preferably, the ratio will be from 5:4 to 3:2.

In addition to the above, the aqueous compatible furan binder composition may further comprise compounds such as ammonia or urea in an amount equal to 0 to 30% by weight. It has been found that the incorporation of urea in the disclosed binder compositions causes further reductions in the emission of free formaldehyde. It will be appreciated by those skilled in the art that other formaldehyde scavengers may be utilized.

When urea is used as a traditional formaldehyde scavenger, it may be incorporated with the furan resin just prior to application to the glass fibers, along with sufficient water to produce a binder having solids between 0.5–80%. Alternatively the urea and furan may be allowed to pre-react. Preferably, the urea and furan will be allowed to pre-react for a period from 1–24 hours prior to application and most preferably from 12–24 hours before use.

In addition, silanes may be incorporated to improve the overall characteristics of the cured glass fiber/binder composition. Silanes appear to have the ability to improve recovery properties by facilitating an adhesive bond between the glass fiber surface and the furan resin.

Suitable silane coupling agents are Union Carbide A1100™, Union Carbide™ A1160, Union Carbide™ A-187, Alpha™ 41B, Dow-Corning™ Z6026 and Wacker™ B.S.-20. Wacker™ B.S.-20 is siloxane based. Experimental data showed a general trend in which all of the tested silanes narrowed the variability of recovery results from 40–70% to 60–70%. Reactive silanes are preferred for use in the present invention. In particular those silanes with reactive groups such as primary amines and -uriedo are most preferred.

Accordingly, it is most preferred that the aqueous compatible furan binder compositions of the invention contain reactive silanes in an amount from 0.05–0.50% by weight and most preferably approximately 0.2% by weight of the total binder solids. The most preferred reactive silane is gamma-aminopropyltriethoxy-silane, supplied by Union Carbide as A1100. However, the actual amount incorporated will be dependent upon the reactivity of the silane and can be determined by one skilled in the art.

It is also anticipated that coupling agents such an organotitanates and organozirconates are suitable for use in the present invention. The amounts of such coupling agents to be incorporated will depend upon the agent's particular chemistry.

It will be appreciated by those skilled in the art that additional materials such as extenders to reduce cost and coloring agents may also be incorporated without departing from the spirit of the invention. Examples of suitable extenders are silica, alumina, and calcium carbonate. Examples of suitable coloring agents are red dye 42 and similar such materials.

Surfactants may also be added to the furan binder compositions of the instant invention. It has been found that sodium dodecyl benzene sulfonate is a preferred surfactant. It may be added in an amount equal to 0.05 to 1.0% by weight.

The invention also provides for glass fiber binding compositions which are comprised of an effective binding amount of an aqueous compatible furan resin comprising the reaction product of a source of ammonia and a first reaction product, said first reaction product comprising the reaction product of an acidic furan resin, a source of reactable formaldehyde and a formaldehyde scavenger; and a sufficient amount of water to result in a binding composition having from 0.5 to 80% nonvolatile. These binders have the advantage of providing reduced levels of VOCs such as formaldehyde, BHMF, furfuryl alcohol without an increase in undesireable compounds such as hexamethyltetraamine.

As discussed previously, Farez XP "M" is the most preferred resin for use in the binding compositions of the invention. Example 7 illustrates the desirable characteristics of this resin and glass fiber binding compositions based on the same. As illustrated in Example 7, glass fiber compositions produced with the use of binding compositions incorporating this particular furan resin have desirable performance properties and exhibit decreased VOC emissions during the manufacture as compared to phenolic based binder compositions. However, as Example 7 illustrates, the furan resin has "residual" formaldehyde. Various lots of the Farez XP "M" resin received from QO have had formaldehyde levels ranging from 9 to almost 13.5%. Also, some binder compositions utilizing the Farez XP "M" resin exhibit an insoluble phase. This insoluble phase is believed to be attributable to a high molecular weight fraction which precipitates out upon dilution with water to less than 25 to 30% solids.

Attempts to resolve these disadvantages while maintaining the desirable performance properties have heretofor been unsuccessful. Attempts to increase the cooking time of the furan resin resulted in an increase in the average molecular weight of the resin which aggravates the formation of an insoluble phase upon dilution with water.

Attempts to reduce VOCs in the glass fiber binder compositions with traditional formaldehyde scavenger technology have been unsatisfactory. Although urea as a traditional formaldehyde scavenger can lower the formaldehyde content of furan resins it does not do it so efficiently. The following data in Table 1 indicates the difference between actual formaldehyde values and those calculated based on the formation of dimethylol urea. The varying amounts of urea were added to Farez XP"M" having 7.22% residual formaldehyde.

TABLE 1

| Sample | Weight % Urea | Reaction Time at 75 C., hrs | Theoretical Formaldehyde, % | Measured Formaldehyde, % |
| --- | --- | --- | --- | --- |
| A | 0 | 0 | 7.22 | 7.22 |
| $B_{1.0}$ | 5 | 1.0 | 2.22 | 2.75 |
| $B_{2.5}$ | 5 | 2.5 | 2.22 | 2.81 |
| $C_{1.0}$ | 10 | 1.0 | −2.78 | 1.65 |
| $C_{2.5}$ | 10 | 2.5 | −2.78 | 1.74 |
| $D_{1.0}$ | 15 | 1.0 | −7.78 | 1.11 |
| $D_{2.5}$ | 15 | 2.5 | −7.78 | 1.14 |

Under acidic conditions such as that encountered with Farez XP "M", i.e. pH=pH 4–6, and high concentrations of urea, urea will form monomethylol urea (MMU) and dimethylol urea (DMU). Over time, DMU and MMU polymerize to form polyMMU, polyDMU and various copolymers. It is believed that these polymeric species form an insoluble yellow/white or white precipitate over time which may reduce shelf life.

Other materials used as traditional formaldehyde scavengers also have disadvantages. When ammonia is utilized solely as a traditional formaldehyde scavenger, it produces hexamethylene tetramine ('hexa') which is nondesireable due to its volatility and odor. In addition, urea, hexamethylene tetramine, and mono and dimethylol urea can all contribute to the production of alkylamines such as trimethylamine, which have a highly undesirable fishy odor.

The instant invention therefore discloses a furan based glass fiber binding composition and a method of making such a binding composition which provides the benefits of an aqueous compatible furan resin which has desirable performance properties, high water compatability, and low VOC levels. The invention provides a glass fiber binding composition which is based on an aqueous compatible furan resin which is the reaction product of a source of ammonia and a 'first reaction' product and sufficient water to form a binding composition having from 0.5 to 80% nonvolatile. The first reaction product is derived from the reaction of an acidic furan resin, a source of reactable formaldehyde and a formaldehyde scavenger. No increase in the levels of nondesirable components is seen in these glass fiber binding compositions or in glass fiber compositions made with the binders. In addition, the claimed furan based binding compositions show a decreased propensity to form a resinous insoluble phase when diluted with water to a particular solids level.

Furan resins suitable for use as the acidic furan resin are identical to those defined above. Most preferably, the furan resin used as the acidic furan will be of the bis hydroxymethyl furan (BHMF) type also discussed above. Suitable furan resins will have an acidic pH from 3.5 to 6.0. Most preferably, the pH of the acidic furan resin will be from 3.8 to 4.5. The most preferred resin is Farez XP"M" at least 7% residual formaldehyde.

The acidic furan resin is combined with a source of reactable formaldehyde and a formaldehyde scavenger to produce a first reaction product. This first reaction product is then reacted with a source of ammonia to produce a reaction product which is an aqueous compatible furan resin. The glass fiber binding compositions of the instant invention comprise an effect binding amount of this aqueous compatible furan resin and a sufficient amount of water to result in a binding composition having from 0.5 to 80% nonvolatile.

The source of reactable formaldehyde may be formaldehyde, paraformaldehyde or any hemiformal containing solution or mixture. Reactable formaldehyde is defined as those formaldehyde molecules which are capable of volatilizing under manufacturing conditions or will react with a traditional formaldehyde scavenger. The formaldehyde may be supplied as an aqueous solution which may or may not be stabilized with methanol such as formalin. Such materials should be readily incorporated into the acidic furan resin. If paraformaldehyde is used, the mixture of the acidic furan resin and paraformaldehyde should be stirred until all of the paraformaldehyde is dissolved.

Alternatively, the source of reactable formaldehyde may be the acidic furan resin itself. As discussed above, some acidic furan resins may contain residual or unreacted formaldehyde, generally in the form of hemiformals. In such cases, the acidic furan resin may serve as the sole source of reactable formaldehyde. In other cases, the source of reactable formaldehyde may be a mixture of the acidic furan resin and an externally added amount of formaldehyde, paraformaldehyde or hemiformal.

In either case, the source of reactable formaldehyde should be present in an amount equal to or greater than the formaldehyde scavenger discussed below. When the acidic furan resin is Farez XP "M" it is most preferred that the source of reactable formaldehyde be present in an amount equal to 5–20 weight percent of the acidic furan resin and the source of reactable formaldehyde. Most preferably, when the acidic furan resin is Farez XP "M" the source of reactable formaldehyde will be present in an amount equal to 15 weight percent. It will be appreciated by those skilled in the art that the amount of reactable formaldehyde will vary with the particular acidic furan resin utilized and the amount of formaldehyde scavenger added.

Formaldehyde scavengers suitable for use in the instant invention are nitrogen containing organic compounds containing at least one amine group per molecule reactive with formaldehyde. Suitable examples include ammonia, primary and secondary amines, urea, substituted ureas, primary amides, dicyandiamide, guanidines and aminotriazines such as melamine, guanamine and benzo-guanamine.

In general, the amount of formaldehyde scavenger added will be limited by practical considerations, economics and desired performance properties. While economics will urge a maximization of the amount, the other two factors will argue for reductions. Most preferably, the formaldehyde scavenger should be present in an amount equal to 1.0 to 15.0 pph of the combination of the acidic furan resin solids and the source of reactable formaldehyde. However, amounts of up to 30 pph are within the scope of the invention. The preferred formaldehyde scavengers for use herein are melamine and urea. Of these, melamine is most preferred.

The formaldehyde scavenger may be added to the previously mixed acidic furan resin and source of reactable formaldehyde. Sufficient water is also added to obtain a mixture having a percent nonvolatile from 40 to 95 and most preferably from 45–85% nonvolatile.

The mixture of the acidic furan resin, the source of reactable formaldehyde and the formaldehyde scavenger may be termed the first mixture. This first mixture should be subjected to a temperature of less than 100° C. for a period of from 1–10 hours. Preferably, the first mixture will be heated to and maintained at a temperature which is between 75°–95° C. for a period of between 1–5 hours. Most preferably, the first mixture will be heated to a temperature between 80°–85° C. for approximately one hour.

Those skilled in the art will appreciate that at higher temperatures the period of heating will be decreased, while at lesser temperatures, the period of heating will be increased. Those skilled in the art will also appreciate that the % N.V. concentration will have a similar effect on the rate of reaction. The more water, the slower the reaction. Although the use of a water bath is indicated in Examples 8 and 9, those skilled in the art will appreciate that a variety of heating apparatus may be used.

At the completion of this first heating stage, the mixture is termed the first reaction product. Most preferably it will be cooled to a temperature of approximately 40° to 60° C. While this is not believed to be necessary to the desired mechanism of reaction, those skilled in the art will appreciate that such cooling will decrease the production of vapors arising from the addition of the source of ammonia to the first reaction product.

The source of ammonia may be any material which upon addition to the first product, produces $NH_3$. Preferably, the source of ammonia will be such that upon addition to the mixture, the pH will rise or stay constant. The most preferred source of ammonia to be added to the first reaction product is $NH_4OH$.

Although the pH of the first reaction product will probably increase in the presence of ammonia, the pH should remain acidic. Most preferably, the pH of the 'second' mixture resulting from the addition of the source of ammonia should be between 5.0 to 6.5. In general, the source of ammonia should be supplied in a quantity such that $NH_3$ is present in an amount from 1–15% parts by weight $NH_3$ per hundred parts of the combination of the furan resin solids, formaldehyde scavenger and any externally added source of reactable formaldehyde. Most preferably, 7–8% pph $NH_3$ will be utilized for a resin of Farez XP "M" as illustrated in Example 8.

After the source of ammonia is mixed with the first reaction product, the resulting mixture should be subjected to a second heating stage. The reactants are cooked at a temperature of less than 100° C. for a period of 1–10 hours. Preferably, the reactants will be heated to and maintained at a temperature of between 75°–95° C. for a period of from 1–6 hours. Most preferably, the reactants will be heated to and maintained at a temperature of 85° C. for a period of four hours. Those skilled in the art will appreciate that at lower temperatures, the period of heating will be increased, while at higher temperatures, the period of heating will be decreased.

While not wishing to be bound by any particular theory, it is believed that this second heating stage results in a reduction of the hexamethylene tetramine concentration. Note, however, that while a final concentration of 0% hexa is the theoretical ideal, Example 8 indicates that hexa concentrations of less than three are desirable. Concentrations of less than 1.0 are most desired.

Sufficient water will be added to the resulting aqueous compatible furan resin to obtain the glass fiber binding composition of the instant invention. It will be appreciated by those skilled in the art that both examples 8 and 9 indicate that increased water compatibility is an additional benefit achieved with the invention. Sufficient water may thus be added so as to produce glass fiber binding compositions having a percent nonvolatile from 0.5 to 80%. Percent nonvolatile in the range of 0.5 to 40% are preferred. When the glass fiber binding composition of the invention is intended for use in a pot and marble process, it is most preferred that the glass fiber binding composition have a percent nonvolatile from 5–12%. When used on a rotary unit, the glass fiber binding compositions should have a most preferred percent nonvolatile of about 15–35%. Percent nonvolatile (% N.V.) may be defined as indicated above. Note that these values are intended to characterize the glass fiber binding composition which is directly applied to the glass fibers.

The aforementioned solutions will in general have viscosities ranging from 1.1 to 600 cPs, preferred viscosities of 2–400 cPs and most preferred viscosities of 2–200 cPs.

It will be appreciated by those skilled in the art that the glass fiber binding compositions as disclosed herein may further comprise a catalyst system for curing the furan resin. As discussed above, suitable materials include inorganic and organic acids, Friedel-Crafts type catalysts, inorganic and organic acid salts, and acid anhydrides. Particular examples of suitable catalysts are indicated above. As discussed above, the most preferred catalyst is a combination of maleic acid and ammonium sulfate.

Preferably, the catalyst system will be present in an amount from 1–20% by weight of active binder solids as defined above. When using the most prefered catalyst, the weight ratio of maleic acid to ammonium sulfate should be from 10:1 to 1:10. Most preferably, the ratio of the two catalysts will be 3:2 to 5:4.

In addition, as discussed above, the disclosed glass fiber binding compositions may further comprise additives such as silanes, coupling agents, extenders and fillers.

Below is a most preferred binding composition made according to the instant invention:

| Most Preferred Formulation | |
|---|---|
| Furan resin solids (Farez XP "M") | 89 parts by weight |
| Paraformaldehyde | 3.5 parts by weight |
| Urea | 7.5 parts by weight |
| $NH_3$ (added as $NH_4OH$) | 3.8 parts by weight |
| Maleic Acid | 5 parts active binder solids |
| Ammonium Sulfate | 4 parts active binder solids |
| Union Carbide A1100 silane | 0.2% of total solids weight |

Although not wishing to be bound by any particular theory, it is believed that the instant invention achieves binding compositions having low VOC levels and increased water compatibility without an increase in nondesireable species like hexa, because of the following reaction mechanism. Those skilled in the art will appreciate that given the complex and competing nature of the various reactions, these mechanisms are expected only.

It is believed however, that the first reaction between the acidic furan resin, the formaldehyde scavenger and the reactable formaldehyde primarily results in the formation of monomethylol urea (MMU) and dimethylol urea (DMU). Polymerizaiton of the MMU and the DMU is expected to continue so as to result in the formation of polyMMU and polyDMU oligomers. However, it is also anticipated that there is a competing reaction between the MMU and DMU species and hydroxyl containing species such as BHMF. This proposed reaction mechanism is supported by the evidence showing that increasing the first heating stage appears to decrease water compatablity and limit shelf life.

The second heating stage is believed to cause the source of ammonia to react with any residual formaldehyde to produce hexamethylene tetramine. However, as indicated above, the hexa concentration decreases during the second reaction. It is believed that the undesirable high molecular weight portion of the original acidic furan resin is solubalized during this second reaction. It is anticipated that the reduction in hexa is tied to a modification of the furan backbone.

The invention further comprises glass fiber binding compositions made according to the present invention. As discussed above, the amount of binder present on the glass fiber composition depends in large part on the performance requirements of the finished product. The amount of resin on a cured glass fiber mat is typically determined by the loss on ignition test (L.O.I.). After ignition of a weighed, cured glass fiber/binder sample at 950° F., the total percent weight loss is determined. This value represents the amount of thermoset binder originally present. The compositions of this invention should contain 1 to 25% by weight cured resin or % L.O.I. Preferably, such systems will contain 2 to 18% L.O.I. It is most preferred that L.O.I. values for the compositions of the instant invention range from 4 to 12%.

It is anticipated that the glass fiber/binder compositions of the instant invention may be darker in color than glass fiber batts produced with traditional phenol formaldehyde binders. However, in many cases the dark color and thermal resistance of furan based binders are favored for many OEM and industrial fiber glass markets, such as duct and furnace liners and automotive hoodliners.

One of the most desirable properties required of glass fiber/binder compositions is a high compressibility ratio of between 4–12:1 and recovery values of between 40 to 100%. This is especially true of glass fiber products with densities of approximately ½ pound to 1 pound per cubic foot. As previously discussed, such materials have great applicability for use in insulation.

The recovery of a glass fiber/binder composition is generally tested via the following method known as the "Recovery test". Cured glass fiber/binder compositions having densities of between 0.5 to 1.0 pound per cubic foot are compressed to densities of approximately 2.0 to 4.0 pounds per cubic foot. The compressed materials are inserted into humidity cabinets and are subjected to temperatures of between 25° to 70° C. at 95% R.H. After 2 to 500 hours, the samples are uncompressed and left to recover for a period of 1.0 hour. Their resultant "recovered" thicknesses are measured and the percent recovery calculated as a percentage of the initial thickness.

Most preferably, the glass fiber compositions disclosed herein will recover between 60 to 100% of their initial thickness and most preferably between 70–100%.

Although not wishing to be bound to any particular theory, it is believed that the ability of the glass fiber compositions to recover is substantially influenced by the modulus of the glass fibers themselves. As a result, the distribution of the binder on the glass fibers affects not only the movement of the individual glass fibers but also the collective overall movement and hence the recovery characteristics.

Accordingly, it is most preferred that the aqueous compatible furan resins of the instant invention be present mainly at a portion of the glass fibers junctions.

Furthermore, the number and size of the binder-junction furan resin particles appears to have a direct effect on recovery properties. It is also believed that some sheathing of the glass fibers by the binder may contribute to the recovery properties of the fiber glass batt. However, it will be appreciated that in the glass fiber/binder compositions of the instant invention, the binder does not completely fill the interstitial space surrounding the individual glass fibers.

Figure 2:
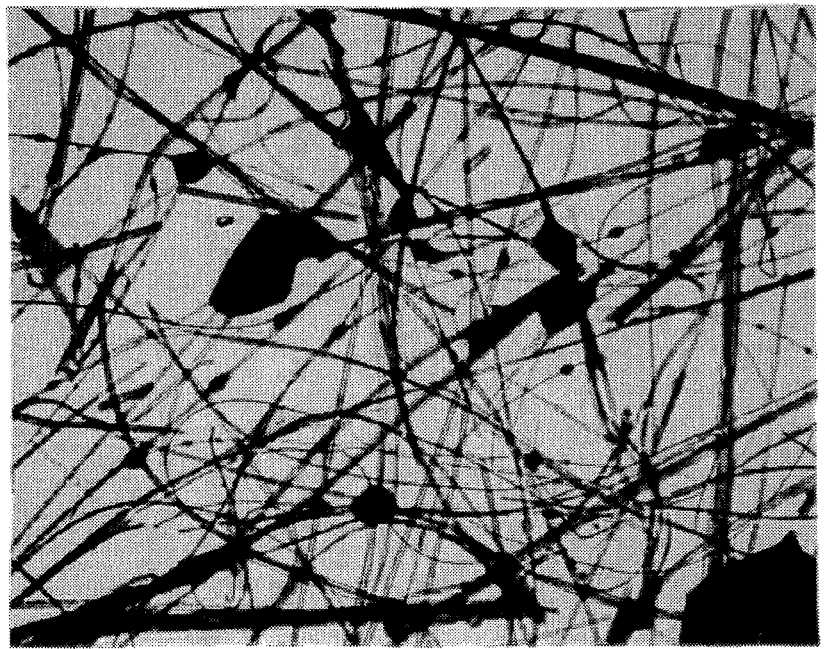
FIG. 2 illustrates a desired distribution of a 40% N.V. bis(hydroxmethyl)furan resin based binder applied to glass fibers.

FIGS. 1 and 2 illustrate acceptable distributions of binder on glass fibers. FIGS. 1 and 2 illustrate acceptable distributions of bis(hydroxymethyl)furan resin-based binders. The binder of FIG. 1 has ammonium sulfate as catalyst. The binder of FIG. 2 contains a combination of maleic acid and ammonium sulfate. Compositions of the binders used to produce the illustrated distributions are given in Table 2.

FIGS. 1 and 2 also represent different methods of binder application. FIG. 1 illustrates binder distribution derived from applying the binder through a fiberglass column expander whereas FIG. 2 shows distribution resulting from application through an air assisted spray nozzle.

As Table 3 shows, both binder systems and application methods produced fiberglass product with acceptable recoveries. There is a sufficient proportion of bonded junction points to non-bonded junction points in both figures to provide adequate product recovery. It is believed that the average size of such binder-junction particles should most preferably be no larger than 1 to 20 times the average fiber diameter.

TABLE 2

Binder Compositions of FIGS. 1 and 2

| Raw Materials | FIG. 1 (66% N.V.) | FIG. 2 (40% N.V.) |
| --- | --- | --- |
| Farez ™ M | 79.23 | 69.34 |
| Catalysts -Maleic Acid | — | 3.47 |
| —$(NH_4)_2SO_4$ | 4.75 | 2.77 |
| % $H_2O$ Added | 15.85 | 24.27 |
| Silane A-1100 | 0.17 | 0.15 |

TABLE 3

| Binder System | % LOI | Binder Junction Size ($\mu^2$) | % Recovery 2 Hrs |
| --- | --- | --- | --- |
| FIG. 1 | 5.8 | 1000 | 70.8 |
| FIG. 2 | 8.3 | 6700 | 74.0 |

Some coating of the shafts of the individual fibers is advantageous in that it diminishes abrasion among individual fibers. This destructive self-abrasion reduces overall strength and hence recovery of the composition because it increases the likelihood of fiber breakage. However, it is not desirable for the furan binder to coat all fibers nor to fill all interstitial space between and around the individual glass fibers in a mat of the same.

The invention further comprises a process for binding glass fiber compositions with the aqueous compatible furan resin compositions described herein. Glass fiber compositions made according to this process have recovery properties sufficient to allow them to be used in a wide variety of end use applications including insulation and or filtration and or separation applications. In addition, the high acid resistance of furan based binders makes them suitable for filtration applications.

The furan binder compositions disclosed herein and intended to be used in the process of the invention have a viscosity from 1–400 cPs at a % N.V. from 0.5 to 80%. While it is desirable that such compositions be homogeneous one phase mixtures, two phase mixtures can provide the desired performance properties.

In general, it is most preferred that the most preferred binding compositions disclosed herein be applied as two-component systems. The first component will preferably be comprised of a homogeneous one phase mixture of the furan resin and additives such as urea, ammonium, silanes etc. if used, and sufficient water to achieve a % N.V. from 40–80%. The second component is comprised of the catalyst system and sufficient water to achieve a % N.V. of about 4–8% and most preferably 6% N.V.

The two components are mixed to form a binding composition as disclosed herein. Such mixing will occur before application. Before application may be defined as any time prior to 72 hours before application as well as in-line mixing immediately prior to the application of the binding composition to the glass fibers.

Application of the previously disclosed furan binder compositions will be to glass fibers using known prior art fiber manufacturing methods. Most preferably, the binder will be applied to the newly formed glass fibers in mid air prior to their collection as described below.

Suitable manufacturing processes are the well known rotary process or pot and marble process. The rotary process is described on pages 12–14 of "Fiber Glass" by Mohr & Rowe previously referenced above.

Delivery of the binder in such processes may be achieved via the use of standard (air less) spray systems, column expanders or conventional air assisted spray equipment. Conventional air assisted spray equipment may be used as described in U.S. Pat. No. 4,832,723, issued May 23, 1989 to Shisler et al., which is incorporated by reference. However, the most preferred application method will be with airless spray equipment.

Most preferably, the glass fibers with a binder sprayed thereon are collected on a moving chain as a loose blanket. The glass fibers will most preferably be newly formed. This chain is pulled into an oven wherein the blanket is partially compressed as it is going through the oven to achieve desired blanket thickness. As the blanket is squeezed between the oven flights, hot air is pumped through the blanket via a series of internal plenums or air ducts.

Although not wishing to be bound to a particular theory, it is believed that cure may be a variable effecting reduced V.O.C. emissions. A desirable cure for VOC purposes is a cure cycle wherein the temperature is increased from ambient of a rate of between 10°–20° C. per minute up to as low as a final a temperature as possible, preferably 200° C. This type of cure cycle is defined herein as a 'ramp cure'. Given appropriate oven conditions this should result in an optimum cure cycle of 10 minutes or less at 200° C. However, oven temperatures between 75° C.–250° C. may be used as long as the residence time in the oven is adjusted accordingly. Currently, the most preferred cure cycle for the compositions illustrated in Table 1 is 8 minutes at an oven temperature of 200° C.

Of course it will be appreciated that the desired cure cycle is affected by the strength of the chosen acid catalyst. For example, in some situations such as the preparation of blown wool (i.e. fiber glass that is to be blown into position in order to give a particular form of insulation), a relatively strong acid catalyst such as para-toluene sulfonic acid (PTSA) may be chosen. With a $pK_a$ of approximately 0.5 to 1.0, may cause the furan resin to cure almost instantly on the glass fiber. Such a cure rate is acceptable because the glass fiber/binder composition does not need to undergo any forming process in the oven. In many cases this type of fiber glass will be reduced in size, normally by a hammer mill, prior to its end use application.

In another application, the fiber glass and binder will be collected and packaged prior to cure. This material is known as uncured wool and is cured via a molding process. It may be molded in-house or packaged and transported to an outside molding facility. Suitable catalysts for this application are the catalysts discussed above. Most preferably the catalyst will be a 5:3 wt:wt, maleic acid and ammonium sulfate mixture, present in an amount equal to 7% by weight. Such molded glass fiber compositions normally have 5 to 25% by weight cured resin or % L.O.I. It is preferred that they have 5 to 20% by weight catalyst.

This uncured wool is typically molded in a 300°–500° F. flat press at 45 second or less intervals. The resulting materials may be utilized in various automotive applications such as headliners. Although compressed, it should be noted that the resulting glass fiber compositions are air permeable. Although, the individual glass fibers may be coated, the furan binder does not fill the interstitial space in the finished article.

The following examples are provided to illustrate the invention but are not intended to limit the invention. All degrees are centigrade and all parts are by weight percent unless otherwise indicated. XP'M' denotes the use of the most preferred furan indicated resin.

EXAMPLE 1

Formaldehyde emissions were initially studied with tube furnace tests.

Compositions of the various samples tested are illustrated below in Table 4. "Farez M™" denotes the resin previously described and supplied by QO Chemicals, while '1300' denotes the use of Quacorr™ 1300 as received from QO Chemicals. Any catalysts used or other materials added are identified to the right of the resin. Preparation of the samples consisted of mixing the various components together under a typical laboratory mixing apparatus.

TABLE 4

| Sample No. | Sample/Catalyst | Total gm resin | % resin** | % solid resin# | Total gm cat. | % cat.** | % solid cat.# | solid res/ cat ratio | ident. other | gm other | % other** | % solids other |
|---|---|---|---|---|---|---|---|---|---|---|---|---|
| 1 | Farez ™M/Citric | 12.0 | 83.2 | 85.0 | 2.41 | 16.7 | 50.0 | 8.46 | A1100 | 0.01 | 0.08 | 100.00 |
| 2 | Farez ™M/Citric | 12.0 | 83.2 | 85.0 | 2.41 | 16.7 | 50.0 | 8.46 | A1100 | 0.01 | 0.08 | 100.00 |
| 3 | Farez ™M/Citric | 12.0 | 83.2 | 85.0 | 2.41 | 16.7 | 50.0 | 8.46 | A1100 | 0.01 | 0.08 | 100.00 |
| 4 | Farez ™M/Citric | 12.0 | 83.2 | 85.0 | 2.41 | 16.7 | 50.0 | 8.46 | A1100 | 0.01 | 0.08 | 100.00 |
| 5 | Farez ™M/Citric | 12.0 | 71.3 | 85.0 | 4.82 | 28.7 | 25.0 | 8.46 | none | 0.00 | 0.00 | 0.00 |
| 6 | 1300/Citric | 12.0 | 83.3 | 100.0 | 2.41 | 16.7 | 50.0 | 9.96 | none | 0.00 | 0.00 | 0.00 |
| 7 | 1300/ZnCl$_2$ | 12.0 | 83.3 | 100.0 | 2.41 | 16.7 | 50.0 | 9.96 | none | 0.00 | 0.00 | 0.00 |
| 8 | 1300/AlCl$_3$ | 12.0 | 71.3 | 100.0 | 4.82 | 28.7 | 25.0 | 9.96 | none | 0.00 | 0.00 | 0.00 |
| 9 | 1300/H$_3$PO$_4$ | 12.0 | 83.3 | 100.0 | 2.41 | 16.7 | 10.0 | 49.79 | none | 0.00 | 0.00 | 0.00 |
| 10 | 1300/H$_3$PO$_4$/ACN# | 6.0 | 45.4 | 100.0 | 1.21 | 9.2 | 10.0 | 49.59 | ACN | 6.00 | 45.42 | 0.00 |
| 11 | 1300/H$_3$PO$_4$/urea | 12.0 | 83.2 | 100.0 | 1.21 | 8.4 | 20.0 | 49.59 | urea | 1.21 | 8.39 | 100.00 |
| 12 | 1300/H$_3$PO$_4$/urea | 12.0 | 83.2 | 100.0 | 1.21 | 8.4 | 20.0 | 49.59 | urea | 1.21 | 8.39 | 100.00 |
| 13 | 1300/H$_3$PO$_4$/urea | 12.0 | 83.1 | 100.0 | 1.22 | 8.5 | 20.0 | 49.14 | urea | 1.21 | 8.39 | 100.00 |
| 14 | 1300/H$_3$PO$_4$/urea | 12.0 | 83.1 | 100.0 | 1.22 | 8.5 | 20.0 | 49.14 | urea | 1.21 | 8.39 | 100.00 |
| 15 | Far M/H$_3$PO$_4$/Urea | 12.0 | 83.1 | 85.0 | 1.23 | 8.5 | 20.0 | 41.43 | urea | 1.21 | 8.39 | 100.00 |
| 16 | Far M/H$_3$PO$_4$/Urea | 12.0 | 83.1 | 85.0 | 1.23 | 8.5 | 20.0 | 41.43 | urea | 1.21 | 8.39 | 100.00 |
| 17 | Far M/(NH$_4$)$_2$SO$_4$ | 2.0 | 83.3 | 85.0 | 2.40 | 16.7 | 40.0 | 10.63 | none | 0.00 | 0.00 | 0.00 |
| 18 | 1300/(NH$_4$)$_2$SO$_4$ | 12.0 | 83.0 | 100.0 | 2.45 | 17.0 | 40.0 | 12.24 | none | 0.00 | 0.00 | 0.00 |
| 19 | Farez ™M/H$_3$PO$_4$ | 12.0 | 83.3 | 85.0 | 2.41 | 16.7 | 10.0 | 42.36 | none | 0.00 | 0.00 | 0.00 |
| 20 | Farez ™M/neat | 12.0 | 100.0 | 85.0 | 0.00 | 0.0 | 0.0 | #DIV/0! | none | 0.00 | 0.00 | 0.00 |

ACN = acetonitrile used to improve solubility of Quacorr ™ 1300.
\* = the balance of this material is water.
\*\* = % of initial charge these should sum to 100%.

The tube furnace is used to heat samples in a controlled environment designed to simulate a fiber glass binder curing process. It consists of a glass tube, about one foot long and with a one inch inside diameter, wrapped with a nickel-chromium wire heater and surrounded with a vacuum jacket. The temperature inside the furnace can be monitored by a thermocouple in the thermocouple well placed between the heater wire and the wall of the inside tube.

Sample support consisted of a glass microfiber filter (Whatman 5.5 cm GF/B) inside a carrier consisting of a 1.5 inch long piece of 0.75 inch diameter Pyrex™ glass tubing. Between 0.15 and 0.90 gram of the final binder solution was placed and weighed to the nearest 0.1 mg on the filter. The sample support and sample were placed near the outlet end of the tube furnace and the cap replaced. Dry air or an inert gas was used to sweep the inside of the tube.

Volatile formaldehyde, released by the curing sample, was trapped and measured using two impingers connected in series downstream from the exit of the tube furnace. Into each of impingers was placed 20 ml of a trapping solution comprised of 2.50 gm of 2,4-dinitrophenylhydrazine in 1000 ml of acetonitrile solvent that also contained 5 ml of glacial acetic acid (to facilitate the reaction between the 2,4-dinitrophenylhydrazine and formaldehyde), and a small, accurately known quantity, of diethyl phthalate as an internal standard. The reaction between 2,4-dinitrophenylhydrazine and formaldehyde to form a stable 2,4-dinitrophenyl-hydrazone derivative is well known to those skilled in the art of analytical organic chemistry and need not be discussed further here.

In initial work (see Tables 5 and 6), these trapping solutions were used directly. However, it was subsequently observed that the acetic acid caused some polymerization of the furfural alcohol and BHMF monomer trapped in the impinger solutions. In later work, (see Table 7), a "Split Impinger Solution" technique was used where the solution used in the impingers was solely acetonitrile. After the tube furnace run a portion of the impinger solution was analyzed directly for furfuryl alcohol and BHMF monomer, and a second accurately measured aliquot was diluted 1:1 with the 2,4-dinitrophenylhydrazine solution described above and analyzed for formaldehyde.

Two methods were used to determine the concentration of formaldehyde, furfuryl alcohol and BHMF monomer captured by the impinger solutions. A GC mass spectrometer (GC/MS) was utilized with a 30 meter DB-5 column with 0.25 micron film thickness, an oven temperature program of 70° C. for three minutes then ramped to 260° C. for 4.7 minutes at 30° C./minute. The injector temperature was 280° C. with a transfer line and trap temperature of 270° C. The scan rate was one scan per second and the range 45 to 450 AMU. Alternatively, high pressure liquid chromatography (HPLC) could be utilized with a one Nova-Pak phenyl column, a mobile phase comprised of a linear gradient 10% methanol, 90% water and 1% acetic acid. A UV detector was used at 274 nm for phenols and 360 nm for the formaldehyde-2,4-dinitrophenylhydrazone derivative.

Representative results from tube furnace burns of the compositions in Table 4 are illustrated below in Table 5:

TABLE 5

| Sample No. | Sample/Catalyst | Burn Time Min. | Burn Deg. C. | start weight grams | final weight grams | µg CH$_2$O/gm sample solid |
|---|---|---|---|---|---|---|
| 1 | Farez ™ M/Citric | 30 | 150 | 0.0983 | 0.0361 | 2969 |
| 2 | Farez ™ M/Citric | 30 | 125 | 0.1013 | 0.0368 | 3144 |
| 3 | Farez ™ M/Citric | 15 | 125 | 0.1018 | 0.0337 | 2514 |
| 4 | Farez ™ M/Citric | 30 | 100 | 0.1002 | 0.0321 | 2007 |
| 5 | Farez ™ M/Citric | 30 | 150 | 0.2779 | 0.1854 | 4997 |
| 6 | 1300/Citric | 30 | 100 | 0.2582 | 0.2112 | 1581 |
| 7 | 1300/ZnCl$_2$ | 30 | 100 | 0.2509 | 0.2131 | 348 |
| 8 | 1300/AlCl$_3$ | 30 | 100 | 0.2643 | 0.1885 | 825 |
| 9 | 1300/H$_3$PO$_4$ | 30 | 125 | 0.2438 | 0.1964 | 1598 |
| 10 | 1300/H$_3$PO$_4$/ACN* | 30 | 125 | 0.2556 | 0.1178 | 3595 |
| 11 | 1300/H$_3$PO$_4$/urea | 30 | 125 | 0.2570 | 0.1840 | 0 |
| 12 | 1300/H$_3$PO$_4$/urea | 25 | 150 | 0.2539 | 0.1654 | 193 |
| 13 | 1300/H$_3$PO$_4$/urea | 4 | 125 | 0.2567 | 0.1857 | 0 |
| 14 | 1300/H$_3$PO$_4$/urea | 25 | 125 | 0.2567 | 0.1857 | 0 |
| 15 | Farez ™ M/H$_3$PO$_4$/Urea | 4 | 125 | 0.2679 | 0.1826 | 0 |
| 16 | Farez ™ M/H$_3$PO$_4$/Urea | 25 | 125 | 0.2695 | 0.1869 | 0 |
| 17 | Farez ™ M(NH$_4$)$_2$SO$_4$ | 30 | 125 | 0.2676 | 0.1666 | 196 |
| 18 | 1300(NH$_4$)$_2$SO$_4$ | 30 | 125 | 0.2516 | 0.1953 | 696 |
| 19 | Farez ™ M/H$_3$PO$_4$ | 25 | 125 | 0.3346 | 0.2063 | 9255 |
| 20 | Farez ™ M(neat) | 25 | 125 | 0.2399 | 0.1757 | 3411 |

*ACN = acetonitrile used to improve solubility of Quacorr ™ 1300.

The results illustrated above indicated that substantial reductions in formaldehyde emissions are possible with the use of aqueous soluble furan based binder compositions.

EXAMPLE 2

Additional tube furnace studies were conducted.

Samples consisted of QO Chemicals' Farez™ M BHMF resin (identified as "Farez M" below) and various catalysts and cure cycles. Compositions consisted of 100.0 grams of Farez™ M and the amount of catalyst identified below. 15 gm of water was added to each sample. The tube furnace apparatus utilized was identical to that described in Example 1. Results are illustrated in Table 6.

Emissions of formaldehyde, furfuryl alcohol, and monomeric BHMF are reported in the sixth, seventh, and eighth columns and are given in units of micrograms (µg) of material per gram of sample solids.

TABLE 6

| Sample No. | Catalyst | Conditions | Sample Wt./gm | wt cat 100 gm resin | CH₂O/μg/ gm slds. resin* | FA μg/ gm slds. resin* | BHMF μg/ gm slds. resin* | % resin retn |
|---|---|---|---|---|---|---|---|---|
| 1 | (NH₄)HSO₄ | 150 C./30 min | 0.2575 | 10 | 3150.15 | 7993.02 | 17.44 | 81.62 |
| 2 | (NH₄)HSO₄ | 150 C./30 min | 0.2759 | 10 | 868.50 | 983.61 | 4.73 | 82.75 |
| 3 | (NH₄)₂SO₄ | 150 C./30 min | 0.1222 | 10 | 0.00 | 23823.67 | 233.21 | 76.47 |
| 4 | (NH₄)₂SO₄ | 150 C./30 min | 0.1277 | 10 | 0.00 | 27537.17 | 201.09 | 74.65 |
| 5 | H₃PO₄ | 150 C./30 min | 0.2524 | 10 | 3864.91 | 1690.73 | 37.41 | 70.67 |
| 6 | H₃PO₄ | 150 C./30 min | 0.2554 | 10 | 4239.39 | 1807.01 | 0.00 | 71.06 |
| 7 | H₃PO₄ | 150 C./30 min | 0.2439 | 5 | 4035.67 | 11950.98 | 30.73 | 70.40 |
| 8 | H₃PO₄ | 150 C./30 min | 0.248 | 5 | 183.49 | 1681.68 | 27.19 | 70.69 |
| 9 | Citric Acid | 150 C./30 min/24 hrs | 0.2479 | 5 | 5829.97 | 16012.63 | 739.92 | 66.97 |
| 10 | Citric Acid | 150 C./30 min/24 hrs | 0.2533 | 5 | 5452.56 | 14806.18 | 842.81 | 66.06 |
| 11 | Citric Acid | 150 C./30 min | 0.2479 | 10 | 3913.94 | 13560.88 | 114.03 | 75.38 |
| 12 | Citric Acid | 150 C./30 min | 0.245 | 10 | 3939.43 | 13529.42 | 134.10 | 75.61 |
| 13 | (NH₄)₂SO₄ | 150 C./30 min | 0.2545 | 5 | 275.58 | 13130.89 | 98.34 | 71.16 |
| 14 | (NH₄)₂SO₄ | 150 C./30 min | 0.2469 | 5 | 264.60 | 16143.65 | 216.60 | 70.72 |
| 15 | Levulinic Acid | 150 C./30 min | 0.2508 | 10 | 3678.54 | 17284.21 |  | 55.77 |
| 16 | Blank | 150 C./30 min | 0.243 | 0 | 993.01 | 14113.46 | 218.34 | 68.92 |
| 17 | Blank | 150 C./30 min | 0.2431 | 0 | 935.14 | 13904.83 | 300.60 | 68.65 |

*Acidified impinged solution may have caused some polymerization of the trapped FA and BHMF monomers, thus actual values may be higher than shown in Table 6.

The above studies illustrate that overall VOC emissions can be controlled by catalyst selection and choice of cure cycle.

EXAMPLE 3

Further tube furnace studies using refined analytical techniques involving the split impinger solutions described in Example 1 gave improved results as to the amounts of furfuryl alcohol and BHMF monomer and are presented in Table 7. In all of these examples, 15 gm of water was added to 100 gm of resin. It will be appreciated that by judicious choice of catalyst(s) the amount of either formaldehyde or BHMF monomer released can be reduced to almost zero.

The illustrated catalysts were added to Farez™ M samples in the amounts provided below. No additional water was added. All samples underwent a burn temperature cure of 30 minutes at 150° C. In Table 7, the values "wt. cat. gm" refer to the amount of catalyst added per 10 gm of resin and the "sample wt in gm" refers to the amount of catalyzed material placed in the tube furnace.

TABLE 7

| Catalyst(s) | Sample wt. gm | wt cat. gm | CH₂O/μg/gm resin | FA μg/gm resin | BHMF μg/gm resin | % resin retn |
|---|---|---|---|---|---|---|
| (NH₄)₂SO₄ | 0.2562 | 0.60 | 0.00 | 45175.56 | 2163.12 | 61.14 |
| (NH₄)₂SO₄ | 0.251 | 0.60 | 0.00 | 41455.27 | 2768.22 | 60.00 |
| (NH₄)₂SO₄ | 0.2551 | 0.60 | 0.00 | 44993.64 | 2458.01 | 60.67 |
| (NH₄)₂SO₄ | 0.2654 | 0.40 | 2088.72 | 44212.22 | 3484.99 | 57.12 |
| (NH₄)₂SO₄ | 0.2325 | 0.40 | 2126.68 | 41116.15 | 3592.42 | 57.73 |
| (NH₄)₂SO₄ | 0.2505 | 0.40 | 1936.44 | 44226.18 | 4018.40 | 57.20 |
| (NH₄)₂SO₄ | 0.2633 | 0.20 | 3496.48 | 45227.38 | 9230.41 | 47.38 |
| (NH₄)₂SO₄ | 0.2586 | 0.20 | 3040.60 | 41266.57 | 8372.24 | 48.85 |
| (NH₄)₂SO₄ | 0.2705 | 0.20 | 2812.20 | 40345.31 | 8332.02 | 47.97 |
| (NH₄)₂SO₄/Maleic Acid[1] | 0.2447 | 0.90 | 1084.02 | 16336.16 | 0.00 | 69.81 |
| (NH₄)₂SO₄/Maleic Acid[1] | 0.2536 | 0.90 | 928.24 | 29365.00 | 0.00 | 67.92 |
| (NH₄)₂SO₄/Maleic Acid[1] | 0.2498 | 0.90 | 1220.66 | 28414.19 | 0.00 | 68.48 |
| (NH₄)₂SO₄/Maleic Acid[2] | 0.2842 | 0.70 | 2169.22 | 86597.94 | 143.09 | 68.34 |
| (NH₄)₂SO₄/Maleic Acid[2] | 0.2494 | 0.70 | 2287.87 | 49540.46 | 0.00 | 67.32 |
| (NH₄)₂SO₄/Maleic Acid[2] | 0.2562 | 0.70 | 1851.48 | 35812.46 | 0.00 | 68.66 |
| Maleic Acid | 0.2459 | 0.50 | 6220.02 | 60365.50 | 910.35 | 63.61 |
| Maleic Acid | 0.2578 | 0.50 | 9212.02 | 40516.11 | 976.05 | 62.61 |
| Maleic Acid | 0.2606 | 0.50 | 6370.30 | 55027.20 | 550.68 | 65.97 |
| Maleic Acid | 0.2479 | 0.75 | 6023.42 | 17118.10 | 0.00 | 69.99 |
| Maleic Acid | 0.2588 | 0.75 | 7581.72 | 16208.22 | 0.00 | 71.03 |
| Maleic Acid | 0.2674 | 0.75 | 7094.98 | 12705.87 | 0.00 | 71.13 |
| Maleic Acid | 0.2571 | 1.00 | 5507.66 | 11453.49 | 0.00 | 72.46 |
| Maleic Acid | 0.2574 | 1.00 | 5431.68 | 13558.01 | 0.00 | 72.53 |
| Maleic Acid | 0.2698 | 1.00 | 5278.40 | 9680.45 | 0.00 | 73.25 |
| (NH₄)₂SO₄/Maleic Acid[3]* | 0.2584 | 0.43 | 3285.02 | 49005.85 | 0.00 | 49.96* |
| (NH₄)₂SO₄/Maleic Acid[3]* | 0.3041 | 0.43 | 2309.06 | 49759.43 | 0.00 | 50.84* |
| (NH₄)₂SO₄/Maleic Acid[3]* | 0.2651 | 0.43 | 3279.16 | 53855.73 | 0.00 | 45.29* |
| Blank | 0.2594 | 0.00 | 4261.02 | 47277.61 | 6913.63 | 46.32 |

TABLE 7-continued

| Catalyst(s) | Sample wt. gm | wt cat. gm | CH$_2$O/µg/gm resin | FA µg/gm resin | BHMF µg/gm resin | % resin retn |
|---|---|---|---|---|---|---|
| Blank | 0.2516 | 0.00 | 4197.82 | 42848.13 | 6029.06 | 49.43 |
| Blank | 0.2493 | 0.00 | 4429.02 | 53313.74 | 5940.61 | 49.83 |

*The Farez ™ M resin in these samples consisted of an aqueous extract "stripped" from Farez ™ M resin as received from QO Chemicals. Equal parts water and Farez ™ M were stirred vigorously for one hour and then allowed to stand without stirring for one hour. The aqueous portion was decanted off and used as the base resin.
[1]The ratio of ammonium sulfate to maleic acid was equal to 4:5.
[2]The ratio of ammonium sulfate to maleic acid was equal to 2:5.
[3]The ratio of ammonium sulfate to maleic acid was equal to 3:5.

EXAMPLE 4

The purpose of this experiment was to establish the ability of silanes to improve moisture resistance in the bonded fibers. Samples without silane had been showing recovery results ranging from 40 to 70%.

Binderless fiber glass batts were prepared by subjecting commercial insulation batts from Schuller International, Inc., type "R-19", to 950° F. to burn out the binder. The "burned out" batts were sliced horizontally into strips approximately ⅜ inch in thickness. Furan binders consisting of 100 grams Farez™ M resin, 6 grams ammonium sulfate, 20 grams water, and a quantity of silane based on its individual activity was sprayed onto both sides of each strip. The three strips were combined and cured at 425° F. for 10 minutes to make up one sample. The brand and quantity of silane used were as follows: Union Carbide A1100, 0.2 parts; Union Carbide A1160, 0.4 parts; Union Carbide A-187[1], 0.2 parts; Alfa 41B[2], 0.2 parts; Dow-Corning Z-6026[3], 0.1 part; and Wacker BS-20[4], 0.5 parts.

[1] A1100 and A1160 are tradenames of Union Carbide.
[2] 41B is a tradename of Alfa.
[3] Z-6026 is a tradename of Dow-Corning.
[4] BS-20 is a tradename of Wacker Silicones.

Four 6"×6" test specimens were cut from each prepared sample, weighed, and measured for thickness. Then the specimens were compressed to one quarter of their original thickness and placed in a humidity cabinet at 155° F. and 95% R.H. for two hours. After removal, the specimens were left to cool undisturbed for 30 minutes and then allowed to expand. Following an hour of specimen equilibration, their thicknesses were again measured. The samples were then reheated to 950° F. for binder determination. (% L.O.I.)

Sample recovery, density and binder values are summarized below.

| Silane | Sample Density | % L.O.I. | % Recovery |
|---|---|---|---|
| UC A-187 | 0.51 | 7.85 | 59.6 |
| BS-20 | 0.55 | 6.04 | 67.1 |
| UC A-1100 | 0.64 | 4.19 | 65.5 |
| UC A-1160 | 0.50 | 6.94 | 59.9 |
| DCZ6026 | 0.56 | 5.08 | 68.0 |
| Alfa 41B | 0.58 | 4.26 | 63.4 |

Samples containing A-187 silanes stuck to the compression plates and those with Z6026 tended to stick although not as tenaciously as the A-187 samples. However, none of the silane containing samples bonded to the plates as strongly as previously tested samples without silane.

A general trend can be seen and summarized in that all silanes tested reduced recovery variability from 40–70% to 60–70%.

EXAMPLE 5

A pilot trial using the furan resin based binders of the invention was conducted. Compositions of the various binders tested are illustrated in Table 8.

TABLE 8

| Sample No. | Farex ™ M lbs. | (NH$_4$)$_2$SO$_4$ lbs. | Maleic Acid lbs | Water lbs | Silane/lbs | Other | Selected Viscosities |
|---|---|---|---|---|---|---|---|
| 1 | 29.8 | 1.788 | 0 | 5.96 | A1100, 0.22 | | |
| 2 | 30 | 1.8 | 0 | 6 | | | 1055 cPs |
| 3 | 31.9 | 1.914 | 0 | 6.38 | A1101, 0.22 | | |
| 4 | 28.6 | 1.716 | 0 | 5.72 | A1160, 0.4 | | |
| 5 | 31.2 | 1.872 | 0 | 6.24 | BS20, 1 | | 960 cPs |
| 6 | 31.5 | 1.89 | 0 | 6.3 | A1101, 0.22 | | |
| 7 | 32.9 | 1.974 | 0 | 6.58 | A1101, 0.22 | Red Dye | |
| 8 | 26.1 | 0.783 | 1.305 | 9.14 | A1101, 0.22 | | |
| 9 | 30.4 | 1.52 | 1.52 | 10.65 | A1101, 0.19 | | |
| 10 | 29.4 | 0 | 1.47 | 10.29 | A1101, 0.22 | | 198 cPS |
| 11 | 400 | 16 | 20 | 140 | A1160, 0.4 | | 288–354 cPS |
| 12 | 400 | 16 | 20 | 140 | A1101, 0.22 | AOS*, 0.2 | 288–354 cPS |
| 13 | 400 | 16 | 20 | 140 | A1101, 0.22 | C61**, 0.2 | 288–354 cPS |
| 14 | 400 | 16 | 20 | 140 | A1101, 0.22 | | 288–354 cPs |

*AOS = Witconate AOS (Witco Inc.) olefin sulfonate ethanolated alkylguanidine amine complex.
**C61 = Aerosol C-61 surfactant produced by American Cyanamid (Ethenylated Amine Complex).

TABLE 9

| Sample No.* | Platen Temp F. | Oven Temp F. | % LOI | % Recovery |
| --- | --- | --- | --- | --- |
| 1 | 475 | 450 | 5.6 | 74.4 |
| 3 | 475 | 450 | 5.8 | 70.8 |
| 4A | 475 | 450 | 4.8 | 73.5 |
| 4B | 475 | 450 | 3.5 | 75.5 |
| 4C | 475 | 450 | 5.2 | 66.4 |
| 5 | 475 | 450 | 3.0 | 74.1 |
| 8B | 475 | 450 | 4.3 | 71.4 |
| 8C | 475 | 450 | 5.0 | 78.0 |
| 9 | 475 | 450 | 5.6 | 76.3 |
| 10 | 475 | 450 | 7.2 | 72.9 |
| 11 | 475 | 450 | 9.6 | 76.1 |
| 12 | 475 | 450 | 7.5 | 74.9 |
| 13 | 475 | 450 | 7.9 | 75.4 |
| 14A | 550 | 475 | 8.8 | 75.5 |
| 14B | 500 | 450 | 8.6 | 75.2 |
| 14C | 475 | 425 | 7.8 | 74.3 |
| 14D | 450 | 400 | 8.1 | 73.5 |
| 14E | 450 | 375 | 8.6 | 74.5 |
| 14F | 450 | 350 | 8.6 | 72.3 |

The above results indicate that the furan resin based binders of the instant invention produced fiber glass binder compositions that produce commercially acceptable recovery values.

EXAMPLE 6

A Furan based binding composition utilizing a furan resin were tested on a pot and marble unit manufacturing pipe insulation. "A" and "B" designate two different lot numbers of the Farez XP "M" type resin which had been treated with the two-stage process described above to reduce VOC levels. The characteristics of the two resin batches are set forth below.

TABLE 10

CHARACTERISTICS OF FURAN RESIN XP "M" TREATED TO REDUCE VOC'S

|  | A | B |
| --- | --- | --- |
| Furfuryl alcohol (%) | 0.18 | 0.21 |
| Water (%) | 27.2 | 27.9 |
| Formaldehye (%) | 0.8 | 1.2 |
| pH | 7.17 | 7.15 |
| Water Compat. (%) | 100 | 100 |
| Viscosity | — | — |
| Cloud Pt. | 64.7 | 67.8 |

The formulas of the tested binding compositions are set forth below.

TABLE 11

BINDER COMPOSITIONS

| Run # | Resin Lot # | Resin solids, % | Tartaric Acid, pph | Ammonium Sulfate pph | Total binder Wt, lbs. |
| --- | --- | --- | --- | --- | --- |
| 1 | A | 6.8 | 5.5 | 1.1 | 443.6 |
| 2 | B | 6.8 | 6.5 | 2.2 | 444.2 |

Note:
All binders had 0.2% A1100 silane added

To an aqueous dispersion of resin A, 5.5 pph tartaric acid and 1.1 pph ammonium sulfate were added. Pipe formation was immediate and sustainable. The mandrel temperature was set at 330° F. and the oven temperature was brought to 375° F. Stack emissions were almost invisible. This combination of resin and oven conditions resulted in yellow-brown insulation tubes, which became slightly darker as the oven temperature was raised from 375° to 400° F. The binder content of the tubes was in the calculated range at 10.8%.

The catalyst levels and oven temperature were both raised in the next run. Resin B was a duplicate of the one used in the first run. A 6.5:2.2 pph ratio of tartaric acid to ammonium sulfate coupled with an oven temperature of 425° F. produced dark brown tubes with 10.5% binder content. Stack opacities were higher, about the same percentage as generated by phenolic binders, and some smoke formed in the curing oven. Tube production remained good.

EXAMPLE 7

A pilot trial was conducted on a rotary process producing building insulation. A furan binder system was metered and in-line mixed, and applied using an airless spray unit. Binder formulation was carried out in two 100 gallon polyethylene tanks placed next to the binder table as per the following:

TABLE 12

| Tank 1 | | Tank 2 | |
| --- | --- | --- | --- |
| XP'M | 700 lbs | Maleic Acid | 32.9 lbs |
| Urea | 70.56 lbs | Ammonium Sulfate | 26.32 lbs |
| Silane (A1101) | 794 grams | Water to 108 gallons | |
| Water to 108 gallons | Solids | 6.71 lbs/gal | 0.55 lbs/gal |
| Weight basis | 73.2% | 6.54% | |

The resin/urea mix was allowed to prereact overnight prior to the trial. The resin and catalyst solutions were mixed just prior to application to newly formed glass fibers. The binder and additive pump rates were constant at 0.3 gallons per minute with an additional 0.5 gpm being added in line (fluids total was 1.2 gpm). This translated into 2.18 lbs/min of binder solids i.e. approx. 20% binder solids. The Farez XP "M" furan resin was not treated according to the instant invention to reduce $CH_2O$ and other VOCs and may be characterized by the following data:

| FA | 0.43% |
| --- | --- |
| Formaldehyde | 13.3% (tested using hydroxylamine HCl) |
| | 10% (2,4 DNPH) |
| Water | 6% |
| Viscosity | 1190 cps |
| pH | un-neutralized |

Standard BI HERM fiberizing conditions were used, with a pull rate of 1600 lbs/hr. Prior to the trial the oven chain was cleaned using a single high pressure water jet, traversed across the chain, which took around 7 hours. In spite of this, the chain remained substantially blocked.

Product not packaged and saved for recovery testing was converted to blowing wool. The conditions for the curing of the furan binder is shown in the following table.

| | | Furan Binder |
| --- | --- | --- |
| Searing Roll | Top Temperature | 500–510° F. |
| | Bottom Temperature | 460–465° F. |
| | Gap | 2–13/16° F. |
| Platten Temperatures | Top Temperatures | 461–475° F. |
| Oven Temperatures | Bottom Temperatures | 472–475° F. |
| | #1 Oven | 375° F. |
| | #2 Oven | 334–472° F.** |

**Oven temperature was difficult to maintain.

The manufactured thickness of the furan-bonded blankets rated from 6.3 to 6.6 inches after adjustments in searing roll temperatures and spacing (it was 6.0 inches before the adjustment). LOI's ranged from 5.4 to 7.2%.

Out-of-bag or quick recoveries of the furan-bonded batts were measured. Two bags of the furan-bonded batts, taken before the searing-roll changes, averaged 5.43 inches. After the adjustments, four additional bags of furan batts were tested; these averaged 5.73 inches.

Slack Test Study

For the stack test study midget impingers (collection site) were employed on the oven stack and the front collection stack (drawing through covered chain). The midget impinger data is non-isokinetic and non-traverse. Small air pumps were used to sample 500 ml/min air for the cartridges and 1000 ml/min air for the mini impingers. Five 45 minute samples were taken during the furan run. Some of the formaldehyde cartridge runs were aborted after a short time due to moisture from the stack condensing out in the packing. For the furan run the first sampling was started approximately 1 hour into the trial.

Acetronitrile filled impingers (volume 20 ml) were used, without filters, to identify and quantitate phenol, formaldehyde, 2-hydroxymethyl phenol (2-HMP), 4-hydroxymethyl phenol (4-HMP), FA, bishydroxymethyl furan (BHMF), and 5 methyl furfural (5 mF). Ammonia was trapped in 0.1N sulfuric acid and analyzed for by ion chromatography. Formaldehyde determinations were achieved by derivatizing with 2,4 DNP under acidic conditions (acetic acid) and analyzing the resultant solutions using HPLC. Analysis of the acetronitrile solutions was done using GC-MS. No significant overload problems were encountered i.e. bleed through to the back impingers was acceptable. To compliment the acetronitrile formaldehyde determinations Waters DNP cartridges were also used. Table 1 shows a summary of the stack test results. The data has been calculated assuming flow rates of 11231 ft³/min and 21537 ft³/min for the collection and oven stacks respectively.

TABLE 13

Summary of Midget Impinger Emission Data Obtained

| Sample Collection Site | FA, lb/hr | BHMF, lb/hr | 5 mF, lb/hr | CH₂O cart lb/hr | CH₂O imp. lb/hr | NH₃ lb/hr |
|---|---|---|---|---|---|---|
| Front Stack | 0.080 | 0.038 | 0.055 | 0.126 | 0.058 | 0.117 |
| Oven Stack | 0.080 | 0.475 | 0.098 | 0.201 | 0.123 | 0.362 |

Note that the total emission of 0.16 lbs/hr of FA is in line with expectations. Previous tube furnace studies have shown that around 50 to 75% of the FA present in the system is lost as a VOC emission. During this run approximately 0.34 lbs/hr of FA was applied to the fiberglass and so the data appears valid for the furan run. Also, the 5 mF emissions are in line with the content of this volatile in the resin (around 0.2%). Thus, based on the FA and 5 mF numbers, a high degree of confidence in the furan emission results can be implied.

EXAMPLES 8

A glass fiber binding composition was prepared with a furan resin which was treated to reduce the level of VOC's such as formaldehyde, BHMF etc. The acidic furan resin used was Farez XP "M". It has a pH of 3.8 and contained 6.4% water. 89 parts Farez XP "M" furan resin solids was mixed with 3.5 parts paraformaldehyde and stirred until the paraformaldehyde dissolved. 7.5 parts of urea were then added. The mixture was placed in a beaker and water added such that the solids level was adjusted to 80%. The beaker was covered and placed in a water bath at a temperature of 85° C. The reactants were heated to and maintained at 85° C. for up to two hours. Sample aliquots were taken after one hour and two hours. The samples were cooled to about 50 degrees C. and then frozen for later analysis of VOC levels. Analysis of the one hour sample indicated that FA=0.31%, BHMF=29.16%, 5 mF=0.15%, and furfural=0.16%. Analysis of the two hour sample showed, FA=0.19%, BHMF=19.99%, 5 mF=0.15%, and furfural=0.15%. Note, these values and those below are in % by weight of acidic furan resin solids.

The remaining one and two hour samples which had not been frozen were then treated with 3.8 parts ammonia. The source of ammonia was a NH₄OH solution having 30% NH₃ by weight in water. Each sample was then placed in a water bath at 85 C. for one hour. Analysis of the resulting reaction product showed FA=0.18%, hexa=0.83%, BHMF=21.57%, 5 mF=0.14%, furfural=0.09%, CH₂O=1.91% for the one hour urea sample and FA=0.15%, BHMF=18.92%, 5 mF=0.14%, furfural=0.10%, hexa=0.41%, CH₂O<1.0% for the two hour urea sample. The sample that had been treated for one hour with urea and then one hour with ammonia showed a marked improvement in water compatibility with only traces of insolubles when diluted down to 6 and 20% solids in water to form binder compositions. The binding composition using the furan resin that had been treated for two hours with urea and then one hour with ammonia showed significant amounts of water insolubles.

EXAMPLE 9

A second glass fiber binding composition was prepared with a furan resin which was treated to reduce the level of VOC's such as formaldehyde, BHMF etc. The acidic furan resin used was Farez XP "M". It has a pH of 3.8 and contained 6.4% water. 89 parts Farez XP "M" furan resin solids was mixed with 3.5 parts paraformaldehyde and stirred until dissolved. 7.5 parts melamine was added along with water to produce 80% solids. The material was placed in a water bath at 85° C. for up to two hours. Analysis of samples taken after one hour indicated that the FA=0.00%, BHMF=16.79%, 5 mF=0.16%, furfural=0.16%. The sample taken after two hours showed FA=0.29%, BHMF=25.53%, 5 mF=0.17%, furfural=0.14%.

The remaining one and two hour samples were then cooled to 50 C. and treated with 3.8 parts ammonia from an NH₄OH solution having 30% NH₃ by weight of water. Each sample was then placed in a water bath at 85 C. for an additional one hour. Analysis showed FA=0.00%, BHMF=15.17%, 5 mF=0.13%, furfural=0.11%, hexa=0 42% for the one hour melamine sample and FA=0.00%, BHMF=17.79%, 5 mF=0.15%, furfural=0.09%, hexa=0.96% for the two hour melamine sample. Both samples that had undergone the melamine and then ammonia treatment showed no resinous insolubles on dilution with water.

While the best modes for carrying out the invention have been described in detail, those familiar with the art to which the invention relates will recognize various alternative designs and embodiments for practicing the invention as defined by the following claims.

What is claimed is:

1. A method of making a glass fiber binding composition, comprising the steps of:
   providing an effective binding amount of an acidic furan resin;
   providing a source of reactable formaldehyde;
   mixing a formaldehyde scavenger with the furan resin in the presence of the source of reactable formaldehyde to form a first mixture;
   heating the first mixture to a temperature of less than 100 degrees C. for period of from 1 to 10 hours;
   adding a source of ammonia to the first mixture to form a second mixture;
   heating the second mixture to a temperature of less than 100 degree C. for a period of from 1 to 10 hours; and
   adding sufficient water to form a binding composition having from 0.5 to 80% nonvolatile.

2. The method of claim 1 where the step of providing a furan resin comprises providing the reaction product resulting from the polymerization reaction wherein at least one reagent is selected from the group consisting of the furan containing molecule having the general formula:

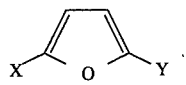

and its analogs thereof having 0 to 1 carbon-carbon double bonds,
wherein X and Y are independently comprised of organic molecular groups,
aqueous compatible furan resin further comprises providing the reaction product where X and Y are independently comprised of molecular groups comprising one or more functional moieties selected from the group consisting of hydrogen, $C_1$–$C_{10}$ alkyl groups, polysubstituted vinyl radicals, polysubstituted aromatic groups, ketones, anhydrides, polysubstituted furfuryl, hydroxyls, aldehydes, carboxylic acids, esters, ethers, amines, amides, imines, imides, alkynes, alkyl halides, aromatic halides, olefinic halides, ethers, thiols, sulfides, nitriles, nitro groups, sulfones, sulfonic acids, carbofunctional siloxanes, and mixtures thereof.

3. The method of claim 1 where the step of providing a source of reactable formaldehyde comprises providing an acidic furan resin.

4. The method of claim 1 where the step of providing a source of reactable formaldehyde comprises adding at least a portion of the source of reactable formaldehyde to the acidic furan resin, said source being selected from the group consisting of formaldehyde, paraformaldehyde, aqueous solutions of formaldehyde, and formaldehyde based hemiformals.

5. The method of claim 1 where the step of mixing a formaldehyde scavenger comprises mixing a formaldehyde scavenger selected from the group consisting of nitrogen containing organic compounds containing at least one NH group per molecule reactive with formaldehyde.

6. The method of claim 5 where the step of mixing comprises mixing a formaldehyde scavenger selected from the group consisting of ammonia, primary and secondary amines, urea, substituted ureas, primary amides, dicyandiamide, guanidines and aminotriazines.

7. The method of claim 1 where the step of heating the first mixture further comprises heating the mixture to a temperature between 75 to 95 degree C. for a period of from 1 to 5 hours.

8. The method of claim 7 where the step of heating the first mixture comprises heating the mixture for 1 hour at 85 degree C.

9. The method of claim 1 where the step of adding a source of ammonia comprises adding $NH_4OH$.

10. The method of claim 9 where the step of heating the second mixture comprises heating the mixture to a temperature between 75 to 95 degree C. for a period of from 1 to 5 hours.

11. The method of claim 1 where the step of adding a source of ammonia further comprises adding a sufficient amount of a source of ammonia such that $NH_3$ is present in an amount from 1 to 15% by weight of resin solids.

12. The method of claim 1 further comprising the step of adding an effective amount of a catalyst.

13. The method of claim 12 further comprising the step of adding an effective amount of a catalyst selected from the group consisting of inorganic and organic acids and salts thereof, acid anahydrides, metal halides, and mixtures thereof.

14. The method of claim 13 further comprising adding 1 to 20% maleic acid and ammonium sulfate by weight of the composition.